US012587644B2

(12) United States Patent
Zhang et al.

(10) Patent No.: US 12,587,644 B2
(45) Date of Patent: Mar. 24, 2026

(54) TRANSFORMS ON NON-DYADIC BLOCKS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/451,942

(22) Filed: Aug. 18, 2023

(65) Prior Publication Data

US 2023/0396764 A1      Dec. 7, 2023

Related U.S. Application Data

(63) Continuation of application No. PCT/CN2022/076334, filed on Feb. 15, 2022.

(30) Foreign Application Priority Data

Feb. 20, 2021   (WO) ................ PCT/CN2021/077039
Aug. 18, 2021   (WO) ................ PCT/CN2021/113238

(51) Int. Cl.
*H04N 19/12*         (2014.01)
*H04N 7/01*          (2006.01)
(Continued)

(52) U.S. Cl.
CPC ............... *H04N 19/12* (2014.11); *H04N 7/01* (2013.01); *H04N 19/157* (2014.11);
(Continued)

(58) Field of Classification Search
CPC .... H04N 19/96; H04N 19/119; H04N 19/176; H04N 19/70
See application file for complete search history.

(56) References Cited

U.S. PATENT DOCUMENTS

2010/0172409 A1    7/2010   Reznik et al.
2010/0266008 A1   10/2010   Reznik
(Continued)

FOREIGN PATENT DOCUMENTS

CN          110662050 A        1/2020
WO       2016091161 A1        6/2016
(Continued)

OTHER PUBLICATIONS

Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.
(Continued)

*Primary Examiner* — Nam D Pham
(74) *Attorney, Agent, or Firm* — Conley Rose, P.C.

(57) ABSTRACT

A mechanism for processing video data is disclosed. A Unsymmetric Binary Tree (UBT) partition of a parent block is determined to create two sub-blocks with different dimensions. At least one of the sub-blocks includes a side that is non-dyadic. A conversion is performed between a visual media data and a bitstream based on the sub-blocks.

20 Claims, 17 Drawing Sheets

(51) Int. Cl.
| | | |
|---|---|---|
| *H04N 19/157* | (2014.01) | |
| *H04N 19/176* | (2014.01) | |
| *H04N 19/18* | (2014.01) | |
| *H04N 19/625* | (2014.01) | |

(52) U.S. Cl.
CPC ........... *H04N 19/176* (2014.11); *H04N 19/18* (2014.11); *H04N 19/625* (2014.11)

(56) References Cited

U.S. PATENT DOCUMENTS

| | | | |
|---|---|---|---|
| 2010/0312811 A1 | 12/2010 | Reznik | |
| 2013/0064294 A1 | 3/2013 | Sole Rojals | |
| 2015/0264372 A1 | 9/2015 | Kolesnikov | |
| 2018/0176582 A1 | 6/2018 | Zhao | |
| 2018/0205972 A1 | 7/2018 | Piao et al. | |
| 2018/0278951 A1 | 9/2018 | Seregin | |
| 2019/0068980 A1 | 2/2019 | Huang | |
| 2019/0313108 A1 | 10/2019 | Zhang | |
| 2019/0335172 A1 | 10/2019 | Zhao | |
| 2020/0014946 A1* | 1/2020 | Xu | H04N 19/44 |
| 2020/0045313 A1 | 2/2020 | Leleannec | |
| 2020/0045316 A1 | 2/2020 | Leleannec | |
| 2021/0360242 A1 | 11/2021 | Zhang | |
| 2022/0078482 A1 | 3/2022 | Alshin | |
| 2022/0124325 A1* | 4/2022 | Misra | H04N 19/132 |
| 2022/0303536 A1* | 9/2022 | Blasi | H04N 19/176 |
| 2022/0385946 A1* | 12/2022 | Chiang | H04N 19/186 |
| 2023/0396764 A1 | 12/2023 | Zhang | |
| 2024/0040122 A1 | 2/2024 | Zhang | |
| 2024/0064337 A1 | 2/2024 | Koo | |
| 2024/0080480 A1 | 3/2024 | Choi | |
| 2024/0333978 A1 | 10/2024 | Zhang | |

FOREIGN PATENT DOCUMENTS

| | | |
|---|---|---|
| WO | 2018065154 A1 | 4/2018 |
| WO | 2018130414 A1 | 7/2018 |
| WO | 2020006338 A1 | 1/2020 |
| WO | 2021032145 A1 | 2/2021 |
| WO | 2022171071 A1 | 8/2022 |
| WO | 2022174762 A1 | 8/2022 |

OTHER PUBLICATIONS

Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.
Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Sullivan, G., et al., "Overview of the High Efficiency Video Coding (HEVC) Standard," IEEE Transactions on Circuits and Systems for Video Technology, vol. 22, No. 12, Dec. 2012, 20 pages.
Luthra, A., et al., "Overview of the H.264/AVC video coding standard," Proceedings of SPIE vol. 5203 Applications of Digital Image Processing XXVI, Optical Science and Technology, SPIE's 48th Annual Meeting, 2003, San Diego, California, United States, Nov. 19, 2003, 16 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

JEM-7.0: Retrieved from the Internet: https://jvet.hhi.fraunhofer.de/svn/svn_HMJEMSoftware/tags/ HM-16.6-JEM-7.0, Nov. 15, 2023, 1 page.
"Series H: Audiovisual and Multimedia Systems Infrastructure of audiovisual services—Coding of moving video High efficiency video coding," Recommendation ITU-T H.265, Feb. 2018, 692 pages.
Document: JVET-D0117r1, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.
Document: JVET-J1001-v2, Bross, B., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.
Budagavi, M., et al., "Core Transform Design in the High Efficiency Video Coding (HEVC) Standard," IEEE Journal of Selected Topics in Signal Processing, vol. 7, No. 6, Dec. 2013, 13 pages.
International Search Report from PCT application No. PCT/CN2022/076334 dated May 17, 2022, 10 pages.
Document: JVET-K0287-v1, Gao, H., et al., "CE1-2.0.11: Picture Boundary Handling," Joint Video Experts Team (JVET) of ITU-T SG 16 WP 3 and ISO/IEC JTC 1/SC 29/WG 11 11th Meeting: Ljubljana, SI, Jul. 10-18, 2018, 7 pages.
Retrieved from the internet: H.265/HEVC, https://www.itu.int/rec/T-REC-H.265, Jun. 27, 2025, 1 page.
Document: JVET-D0117r1, "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.
Document: JVET-S2001-vG, "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 544 pages.
Document: JVET-J1001-v1, "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 40 pages.
"Advanced Video Coding Standard Workgroup of China," Retrieved from the internet: http://www.avs.org.cn/english/, Jun. 27, 2025, 4 pages.
Document: JVET-T2001-v2, "Versatile Video Coding Editorial Refinements on Draft 10," Joint Video Experts Team (JVET) of ITU-T SG 16 WP 3 and ISO/IEC JTC 1/SC 29 20th Meeting, by teleconference, Oct. 7-16, 2020, 512 pages.
Document: JVET-D0031, Henry, F., et al., "Residual Coefficient Sign Prediction," Joint Video Exploration Team (JVET) of ITU-T SG 16 WP 3 and ISO/IEC JTC 1/SC 29/WG 11 4th Meeting: Chengdu, CN, Oct. 15-21, 2016, 6 pages.
Document: JVET-Q2001-vE, Bross, B., et al., "Versatile Video Coding (Draft 8)," Joint Video Experts Team (JVET)of ITU-T SG 16 WP 3 and ISO/IEC JTC 1/SC 29/WG 11 17th Meeting: Brussels, BE, Jan. 7-17, 2020, 512 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Retrieved from the internet: VTM software: https://vcgit.hhi.fraunhofer.de/jvet/VVCSoftware_VTM.git, Jan. 16, 2024, 4 pages.
Non-Final Office Action from U.S. Appl. No. 18/453,453 dated Mar. 20, 2025, 35 pages.
Notice of Allowance from U.S. Appl. No. 18/660,356 dated Jun. 6, 2025, 15 pages.
Non-Final Office Action from U.S. Appl. No. 18/485,531 dated Jun. 11, 2025, 18 pages.

* cited by examiner

200

Macroblock Partitions

300

CB Partitions

400

Macroblock Partitions

403

401

500

QTBT Partitions

503

501

800

FT Partitions

900

GTT Partitions

Boundary Partitioning Tree

1000

1100

AVS-3.0 Partitions 1101      1103      1105      1107      1109

1200

UQT Partitions

W/8   W/2   W/8   W/4     W/8   W/2   W/4   W/8     W/4   W/8   W/3   W/8     W/8 W/4   W/2   W/8

1201       1203       1205       1207

H/8     H/8

H/2     H/2

H/8     H/4
H/4     H/8

1209       1211

H/4     H/8
H/8     H/4

H/2     H/2

H/8     H/8

1213       1215

1300

1400

1600

1700

1800
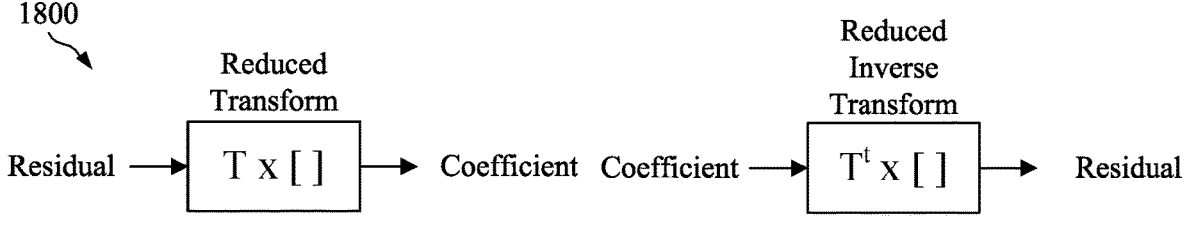
FIG. 18
1900
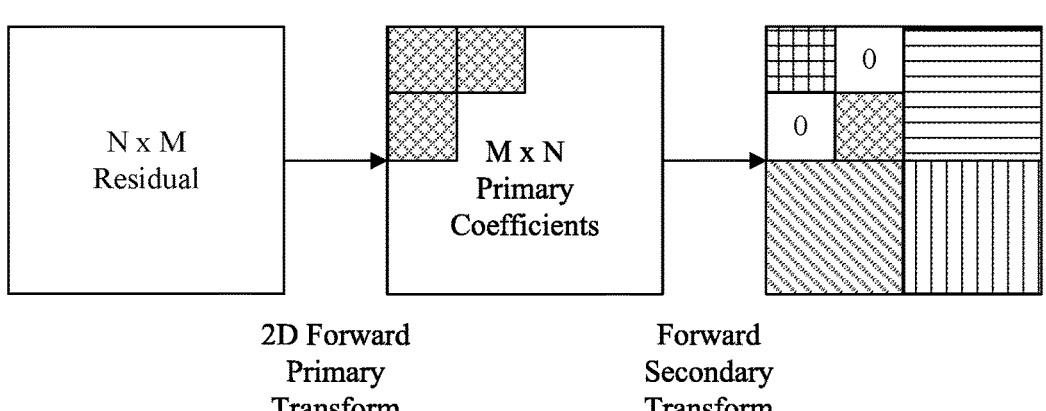
2D Forward        Forward
Primary          Secondary
Transform         Transform
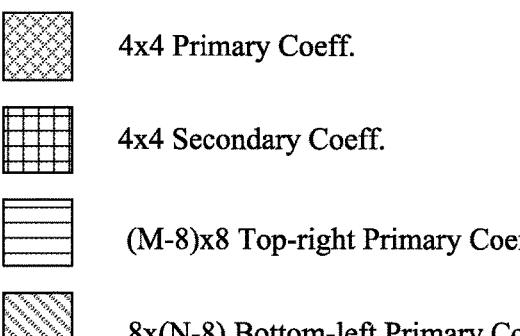
4x4 Primary Coeff.
4x4 Secondary Coeff.
(M-8)x8 Top-right Primary Coeff.
8x(N-8) Bottom-left Primary Coeff.
(M-8)x(N-8) Bottom-right Primary Coeff.
FIG. 19

2000
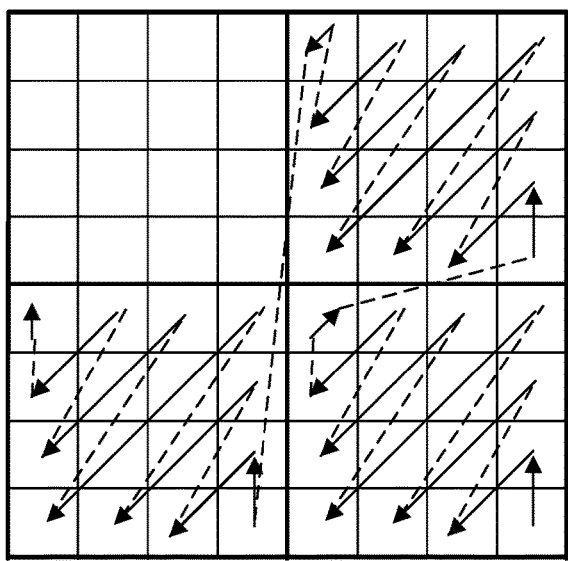
FIG. 20
2100
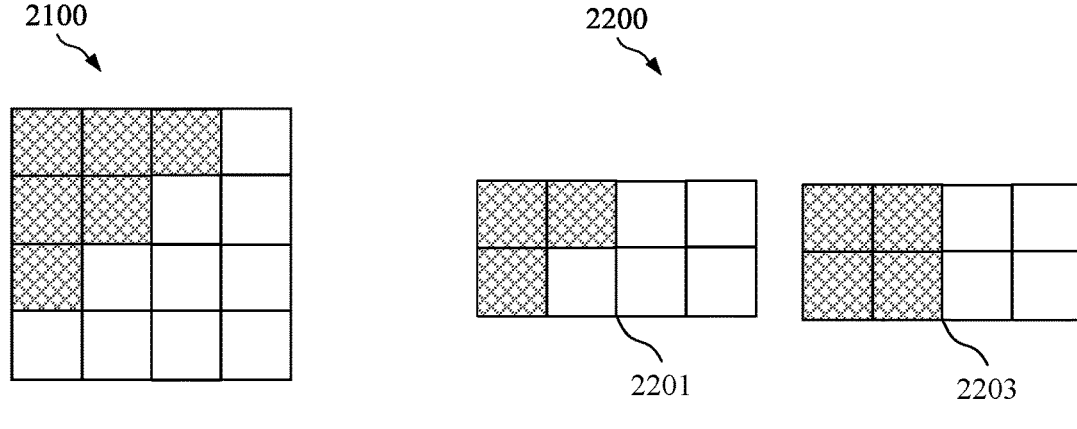
2200
FIG. 21                 FIG. 22

2300

2400

2500

2600

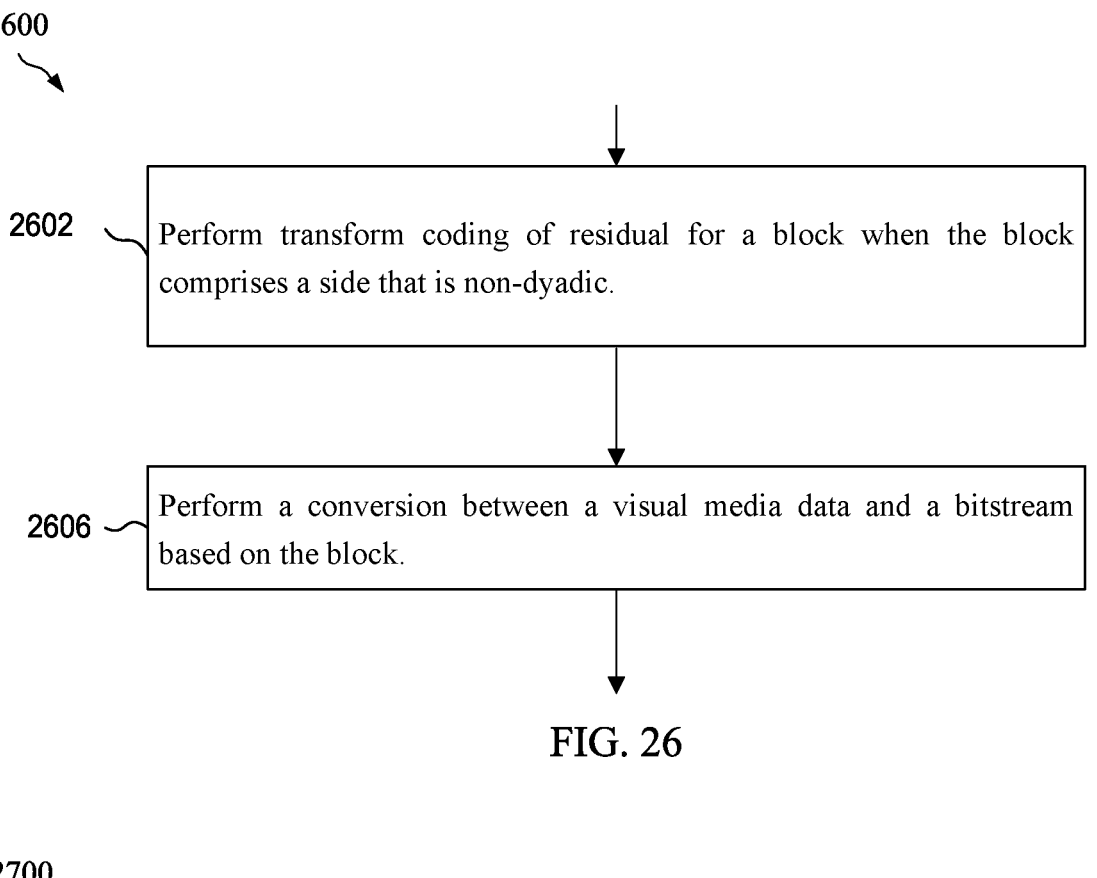

2602    Perform transform coding of residual for a block when the block comprises a side that is non-dyadic.

2606    Perform a conversion between a visual media data and a bitstream based on the block.

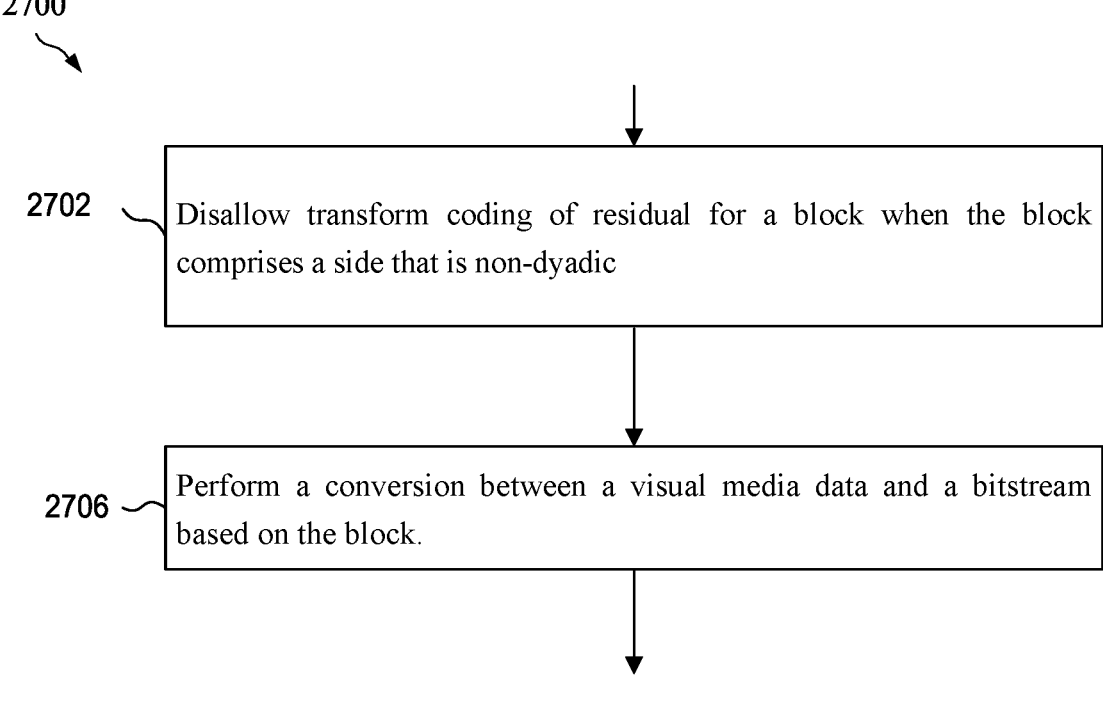

2702    Disallow transform coding of residual for a block when the block comprises a side that is non-dyadic 2706    Perform a conversion between a visual media data and a bitstream based on the block.

TRANSFORMS ON NON-DYADIC BLOCKS

CROSS-REFERENCE TO RELATED APPLICATIONS

This patent application is a continuation of International Patent Application No. PCT/CN2022/076334 filed on Feb. 15, 2022, which claims the priority to and benefits of International Application No. PCT/CN2021/077039 filed on Feb. 20, 2021 and International Application No. PCT/CN2021/113238 filed on Aug. 18, 2021. All the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: performing transform coding of residual for a block when the block comprises a side that is non-dyadic; and performing a conversion between a visual media data and a bitstream based on the block.

Optionally, in any of the preceding aspects, another implementation of the aspect provides that transform coding includes applying a zero-out transform to the block.

Optionally, in any of the preceding aspects, another implementation of the aspect provides that applying the zero-out transform includes setting all residual coefficients outside of a top left rectangular region of the block to zero, wherein the top left rectangular region has a width (W1) and height (H1), and wherein W1 is equal to $2^{\lfloor log_2 W \rfloor}$ and H1 is equal to $2^{\lfloor log_2 H \rfloor}$.

Optionally, in any of the preceding aspects, another implementation of the aspect provides that the block is a non-dyadic block, wherein a dyadic transform is applied to the block, and wherein the block is padded to a dyadic size to fit the dyadic transform.

Optionally, in any of the preceding aspects, another implementation of the aspect provides that the block is padded by fixed value padding, duplicated padding, extrapolation padding, application of a horizontal mirroring axis, application of a vertical mirroring axis, or combinations thereof.

Optionally, in any of the preceding aspects, another implementation of the aspect provides that the block is a non-dyadic block, wherein the block is split into a plurality of dyadic transform units to support transform coding by dyadic transforms.

Optionally, in any of the preceding aspects, another implementation of the aspect provides that transform coding of the block includes application of a non-dyadic transform.

Optionally, in any of the preceding aspects, another implementation of the aspect provides that the non-dyadic transform is a discrete cosine transform (DCT) type two (DCT-2), DCT type eight (DCT-8), discrete sine transform (DST) type seven (DST-7), or combinations thereof.

Optionally, in any of the preceding aspects, another implementation of the aspect provides that transform coding of the block includes application of a non-dyadic multiple transform selection (MTS) transform.

Optionally, in any of the preceding aspects, another implementation of the aspect provides that the MTS transform includes a DCT-2, DCT-8, DST-7, DCT type five (DCT-5), DST type four (DST-4), DST type 1 (DST-1), identity transform (IDT), or combinations thereof.

Optionally, in any of the preceding aspects, another implementation of the aspect provides that MTS is disallowed for application to a non-dyadic block.

Optionally, in any of the preceding aspects, another implementation of the aspect provides that the block is a non-dyadic block, and wherein transform selection for the non-dyadic block employs a same selection rule as transform selection for a dyadic block.

Optionally, in any of the preceding aspects, another implementation of the aspect provides that the block is a non-dyadic block, and wherein transform selection rules for non-dyadic blocks and transform selection rules for dyadic blocks are different.

Optionally, in any of the preceding aspects, another implementation of the aspect provides that DCT-5, DST-4, DST-1, IDT or combinations thereof, are candidates for dyadic blocks and are not candidates for non-dyadic blocks.

Optionally, in any of the preceding aspects, another implementation of the aspect provides that a codeword indicating a transform for the block does not include a combination for any transform candidates that are disallowed for non-dyadic blocks.

Optionally, in any of the preceding aspects, another implementation of the aspect provides that transform coding of the block includes application of a low frequency non-separable secondary transform (LFNST) transform.

Optionally, in any of the preceding aspects, another implementation of the aspect provides that a single kernel from a LFNST set is allowed for non-dyadic blocks.

Optionally, in any of the preceding aspects, another implementation of the aspect provides that LFNST is applied to a region in a non-dyadic block with a width (W1) and a height (H1) where W1×H2 is not 4×4 and is not 8×8.

Optionally, in any of the preceding aspects, another implementation of the aspect provides that a transform is disallowed for application to a non-dyadic block when the non-dyadic block has a width (W) or a height (H) equal to a predetermined value.

Optionally, in any of the preceding aspects, another implementation of the aspect provides that a transform is disallowed for application to a non-dyadic block when the non-dyadic block contains a color component.

Optionally, in any of the preceding aspects, another implementation of the aspect provides that MTS is disallowed for application to a non-dyadic block when the non-dyadic block is predicted by intra sub-partitions (ISP) intra prediction, multiple linear regression intra prediction (MIP), affine intra prediction, geometric merge mode (GEO), or combinations thereof.

Optionally, in any of the preceding aspects, another implementation of the aspect provides that LFNST is disallowed for application to a non-dyadic block when the non-dyadic block is predicted by ISP, MIP, affine intra prediction, GEO, or combinations thereof.

Optionally, in any of the preceding aspects, another implementation of the aspect provides that subblock transform (SBT) is disallowed for application to a non-dyadic block when the non-dyadic block is predicted by affine intra prediction, geometric merge mode (GEO), or combinations thereof.

A second aspect relates to a method for processing video data comprising: disallowing transform coding of residual for a block when the block comprises a side that is non-dyadic; and performing a conversion between a visual media data and a bitstream based on the block.

Optionally, in any of the preceding aspects, another implementation of the aspect provides further comprising setting all residual for the block to zero or inferring the residual to be zero.

Optionally, in any of the preceding aspects, another implementation of the aspect provides that coded block flags (cbf) for the block are not included in the bitstream and inferred to be zero.

Optionally, in any of the preceding aspects, another implementation of the aspect provides that a syntax element specifying a presence of transform unit related syntax for the block is not signaled in the bitstream and inferred to be zero.

Optionally, in any of the preceding aspects, another implementation of the aspect provides that an indication specifying application of transform matrices is not signaled in the bitstream and inferred to be zero.

Optionally, in any of the preceding aspects, another implementation of the aspect provides that disallowing transform coding of residual for the block comprises application of a transform skip, block-based delta pulse code modulation (BDPCM) mode, pallet mode, or combinations thereof to the block.

A third aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A fourth aspect relates to an apparatus for processing video data comprising: a processor; and a non-transitory memory with instructions thereon, wherein the instructions upon execution by the processor, cause the processor to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 is a schematic diagram of example generalized TT (GTT) partitioning structures.

FIG. 18 is a schematic diagram of another example of residual transformation.

FIG. 19 is a schematic diagram of an example forward LFNTS 8×8 process with a 16×48 matrix.

FIG. 20 is a schematic diagram of an example scanning mechanism used to support signaling of LFNTS.

FIG. 21 is a schematic diagram of an example region of interest (ROI) for LFNST kernel set sixteen (LFNST 16).

FIG. 22 is a schematic diagram of an example ROI for LFNST kernel set eight (LFNST 8).

FIG. 26 is a flowchart for an example method of video processing.

FIG. 27 is a flowchart for another example method of video processing.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also. In the present document, editing changes are shown to text by bold italics indicating cancelled text and bold underline indicating added text, with respect to the VVC specification or International Organization for Standardization (ISO) base media file format (ISOBMFF) file format specification.

This document is related to image/video coding, and more particularly to transforms on some special kinds of blocks. The disclosed mechanisms may be applied to the video coding standards such as High Efficiency Video Coding (HEVC) and/or Versatile Video Coding (VVC). Such mechanisms may also be applicable to other image/video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
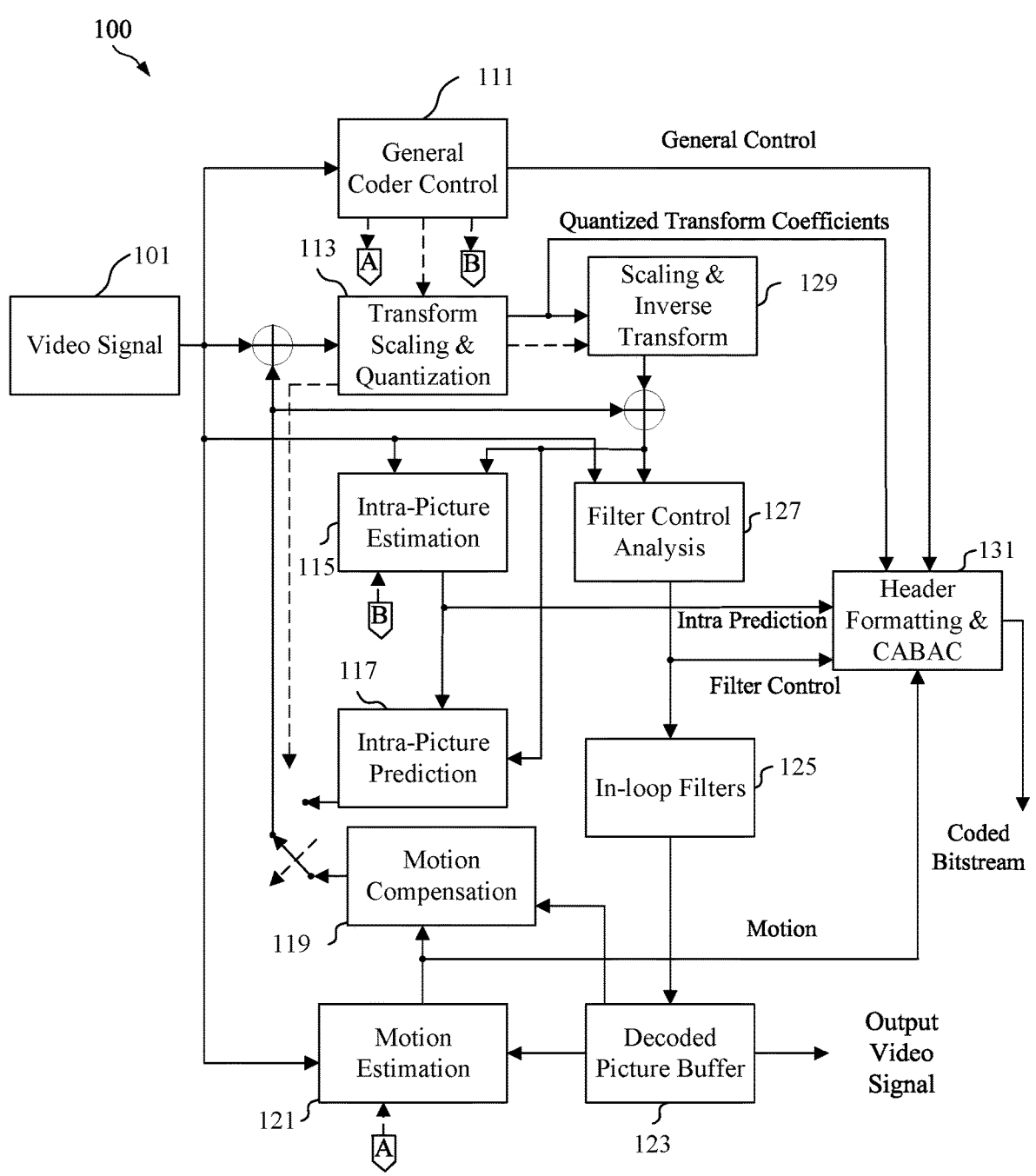
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec system 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and CABAC component 131 to be encoded in the bitstream to signal parameters for decoding at the decoder.

The video signal 101 is also sent to the motion estimation component 121 and the motion compensation component 119 for inter-prediction. A video unit (e.g., a picture, a slice, a CTU, etc.) of the video signal 101 may be divided into multiple blocks. Motion estimation component 121 and the motion compensation component 119 perform inter-predictive coding of the received video block relative to one or more blocks in one or more reference pictures to provide temporal prediction. Codec system 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, video codec 100 may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter-prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figures 2, 3:
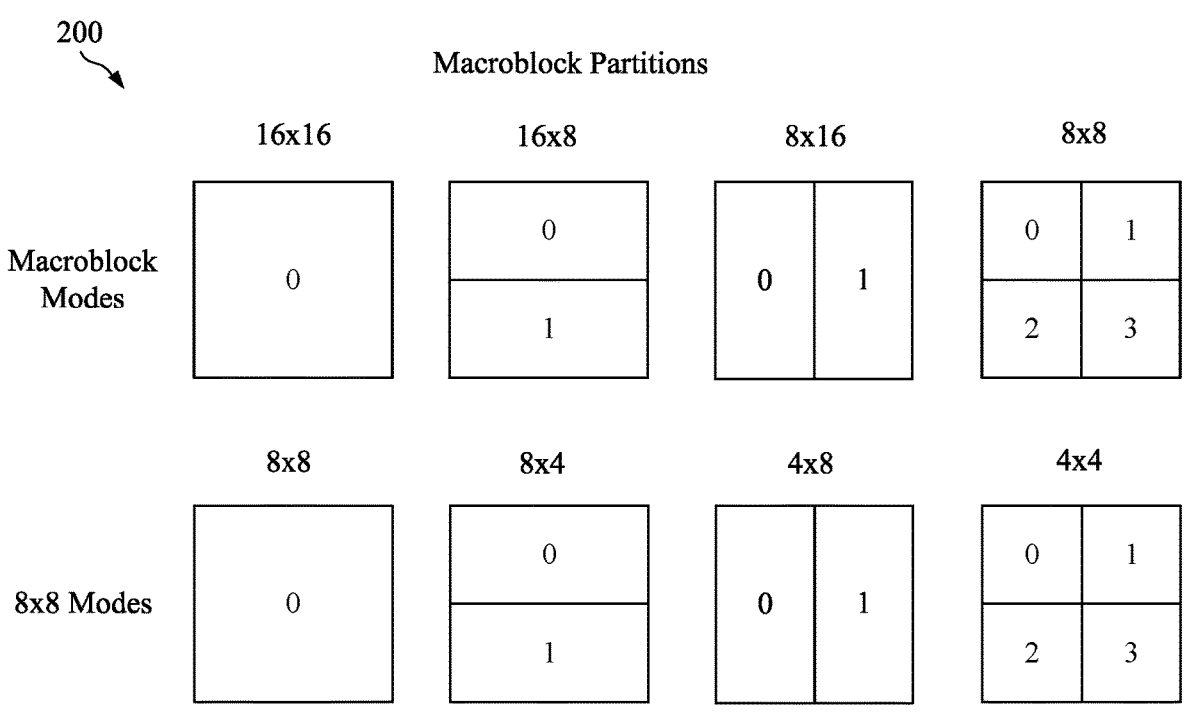
FIG. 2 is a schematic diagram of example macroblock partitions.
FIG. 3 is a schematic diagram of example modes for partitioning coding blocks, for example according to High Efficiency Video Coding (HEVC).

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A Sample is a luma (light) value or chroma (color) value at a pixel.

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, a M/2×M block, a M×M/2 block, a M/2×M/2 block, a M/4×M (left) block, a M/4×M (right) block, a M×M/4 (up) block, and/or a M×M/4 (down) block. It should be noted that the modes 300 for splitting CBs into PBs are subject to size constraints. Further, only M×M and M/2×M/2 are supported for intra picture predicted CBs.

Figures 4, 5:
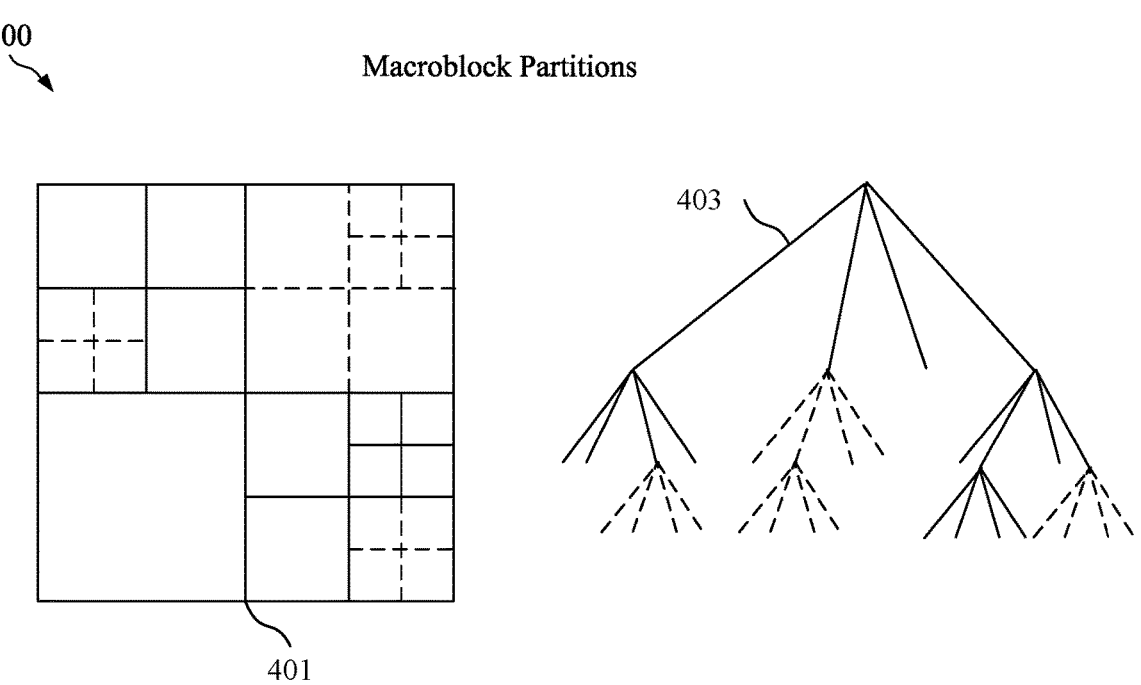
FIG. 4 is a schematic diagram of example method for partitioning a picture for coding residual.
FIG. 5 is a schematic diagram of example method for partitioning a picture, for example according to a quad tree binary tree (QTBT) structure.

FIG. 4 is a schematic diagram of example method 400 for partitioning a picture for coding residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TBs. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts group (VCEG) and MPEG to explore video coding technologies beyond HEVC. JVET has adopted many improvements included such improvements into a reference software named Joint Exploration Model (JEM).

FIG. 5 is a schematic diagram of example method 500 for partitioning a picture, for example according to a quad tree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In the JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quad tree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signalled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figures 6, 7:
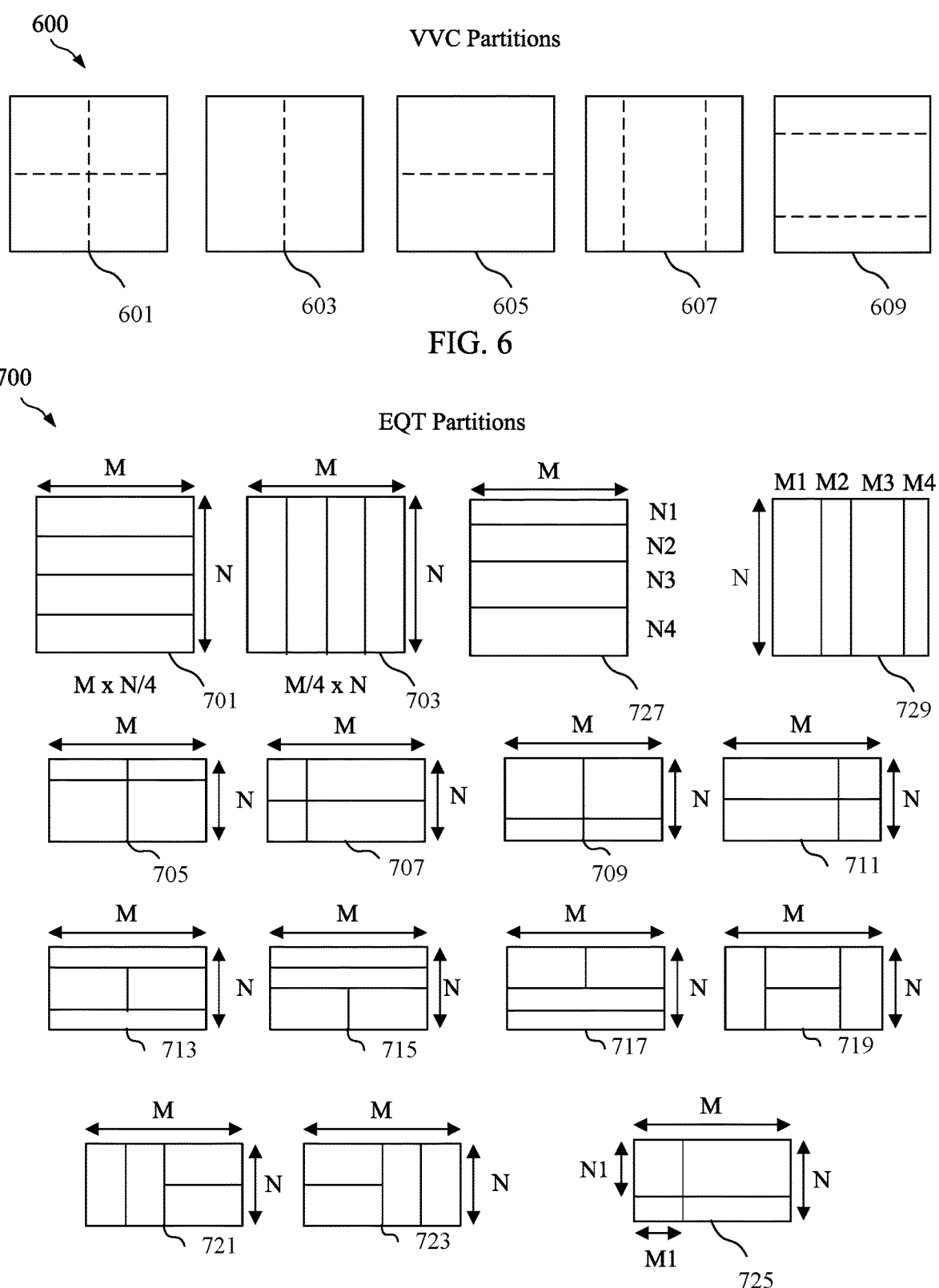
FIG. 6 is a schematic diagram of example partitioning structures used in Versatile Video Coding (VVC).
FIG. 7 is a schematic diagram of example extended quad tree (EQT) partitioning structures.

Triple-tree partitioning for VVC is now discussed. FIG. 6 is a schematic diagram 600 of example partitioning structures used in VVC. As shown, split types other than quad-tree and binary-tree are supported in VVC. For example, schematic diagram 600 includes a quad tree partition 601, a vertical binary tree partition 603, a horizontal binary tree partition 605, a vertical triple tree partition 607, and a horizontal triple tree partition 609. This approach introduces two triple tree (TT) partitions in addition to the quad tree and binary trees.

In an example implementation, two levels of trees are employed including a region tree (a quad-tree) and a pre-diction tree (binary-tree or triple-tree). A CTU is first par-titioned by a region tree (RT). A RT leaf may be further split with prediction tree (PT). A PT leaf may also be further split with PT until a max PT depth is reached. A PT leaf is a basic coding unit. The PT may also be called a CU for conve-nience. In an example implementation, a CU cannot be further split. Prediction and transform are both applied on CU in the same way as JEM. The whole partition structure is named multiple-type-tree.

An extended quad tree is now discussed. FIG. 7 is a schematic diagram 700 of example EQT partitioning struc-tures. An EQT partitioning structure corresponding to a block partitioning process includes an extended quad tree partitioning process for the block of video data. The extended quad partitioning structure represents partitioning the block of video data into final sub-blocks. When the extended quad tree partitioning process decides to apply an extended quad tree partition to a block, the block is always split into four sub-blocks. Decoding of the final sub-blocks is based on the video bitstream. Decoding of the block of video data is based on the final sub-blocks decoded accord-ing to the EQT structure derived.

The EQT partitioning process can be applied to a block recursively to generate EQT leaf nodes. Alternatively, when EQT is applied to a certain block, for each of the sub-blocks resulting from the EQT split, may further be split into BT and/or QT and/or TT and/or EQT and/or other kinds of partition trees. In one example, EQT and QT may share the same depth increment process and the same restrictions of leaf node sizes. In this case, the partitioning of one node can be implicitly terminated when the size of the node reaches a minimum allowed quad tree leaf node size or EQT depth with the node reaches a maximum allowed quad tree depth. Alternatively, EQT and QT may share different depth incre-ment processes and/or restrictions of leaf node sizes. The partitioning of one node by EQT may be implicitly termi-nated when the size of the node reaches a minimum allowed EQT leaf node size or the EQT depth associated with the node reaches a maximum allowed EQT depth. In one example, the EQT depth and/or the minimum allowed EQT leaf node sizes may be signaled in a sequences parameter set (SPS), a picture parameter set (PPS), a slice header, a CTU, a region, a tile, and/or a CU.

EQT may not use a quad tree partition applied to a square block, for example where the block has a size of M×N where M and N are equal or unequal non-zero positive integer values. Instead, EQT splits one block equally into four partitions, such as an M/4×N split 701 or an M×N/4 split 703. Split 727 and split 729 show general examples of split 701 and 703, respectively. For example, split 727 is split into M×N1, M×N2, M×N3, and M×N4, where N1+N2+N3+

N4=N. Further, split 729 is split into M1×N, M2×N, M3×N and M4×N where M1+M2+M3+M4=M.

In another example, the EQT can split the shape equally into four partitions where the partition size is dependent on the maximum and minimum values of M and N. In one example, one 4×32 block may be split into four 4×8 sub-blocks while a 32×4 block may be split into four 8×4 sub-blocks.

In another example, EQT splits one block equally into four partitions, such as two partitions are with size equal to (M*w0/w)×(N*h0/h) and the other two are with (M*(w-w0)/w)×(N*(h-h0)/h) as shown by split 705, split 707, split 709, and split 711. For example, w0 and w may be equal to 1 and 2, respectively, such that the width is reduced by half while the height can use other ratios instead of 2:1 to get the sub-blocks. In another example, h0 and h may be equal to 1 and 2, respectively, such that the height is reduced by half while the width can use other ratios instead of 2:1. For example, split 705 includes a sub-block width fixed to be M/2 with a height equal to N/4 or 3N/4 with a smaller selection for the top two partitions. For example, split 707 includes a sub-block height fixed to be N/2 with a width equal to M/4 or 3M/4 with a smaller selection for the left two partitions. For example, split 709 includes a sub-block fixed to be M/2 with a height equal to N/4 or 3N/4 with a smaller selection for the bottom two partitions. For example, split 711 includes a sub-block height fixed to be N/2 with a width equal to M/4 or 3M/4 with a smaller selection for the right two partitions.

Split 713, split 715, split 717, split 719, split 721, and split 723 show other examples of quad tree partitioning. For example, split 713, split 715, and split 717 show options where the shape is split by M×N/4 and M/2×N/2. For example, split 719, split 721, and split 723 show options where the shape is split by N×M/4 and N/2×M/2.

Split 725 shows a more general case of quad tree parti-tioning with different shapes of partitions. In this case, split 725 is split such that M1×N1, (M−M1)×N1, M1×(N−N1) and (M−M1)×(N−N1).

Figure 8:
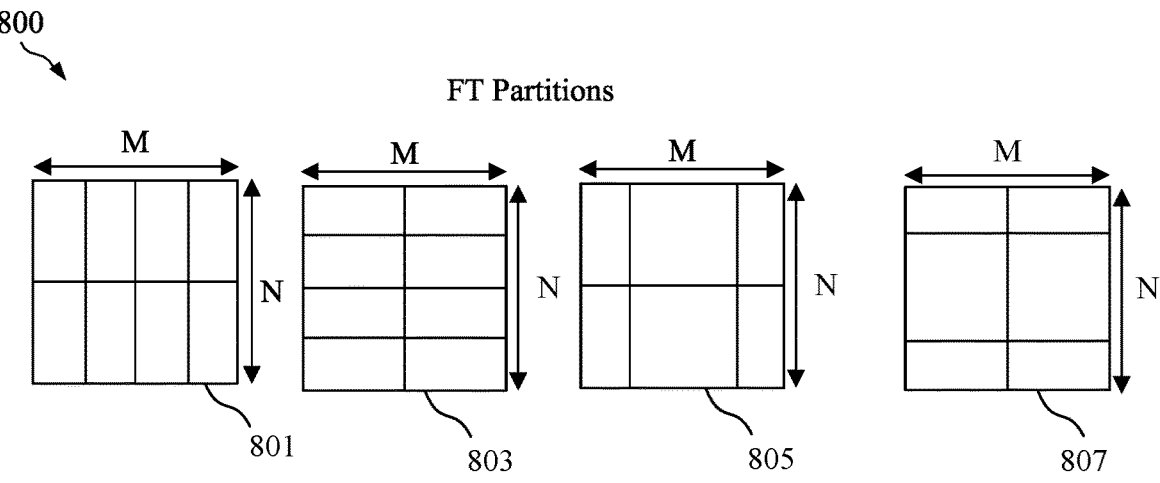
FIG. 8 is a schematic diagram of example flexible tree (FT) partitioning structures.

FIG. 8 is a schematic diagram 800 of example flexible tree (FT) partitioning structures. A FT partitioning structure corresponds to a block partitioning process including an FT partitioning process for the block of video data. The FT partitioning structure represents a partitioning for a block of video data into final sub-blocks. When the FT partitioning process decides to apply a FT partition to a block, the block is split into K sub-blocks wherein K could be larger than 4. The final sub-blocks can be coded based on the video bitstream. Further, the block of video data can be decoded based on the final sub-blocks decoded according to the FT structure derived. The FT partitioning process can be applied to a given block recursively to generate FT tree leaf nodes. The partitioning of one node is implicitly terminated when the node reaches a minimum allowed FT leaf node size or FT depth associated with the node reaches a maximum allowed FT depth. Further, when FT is applied to a certain block, multiple sub-blocks can be created. Each of the sub-blocks created by FT may further be split into BT, QT, EQT, TT, and/or other kinds of partition trees. In an example, the FT depth or the minimum allowed FT leaf node sizes or the minimum allowed partition size for FT may be signaled in a SPS, a PPS, a slice header, a CTU, a region, a tile, and/or a CU. Similar to EQT, all of the sub-blocks created by FT partitions may be the same or different sizes.

Schematic diagram 800 includes example FT partitioning structures where the number of sub-blocks, denoted as K, is set equal to six or eight. Split 801 is a partitioning structure with K=8, M/4*N/2. Split 803 is a partitioning structure with K=8, M/2*N/4. Split 805 is a partitioning structure with K=6, M/2*N/2 and M/4*N/2. Split 807 is a partitioning structure with K=6, M/2*N/2 and M/2*N/4.

FIG. 9 is a schematic diagram 900 of example generalized TT (GTT) partitioning structures. For the TT partitioning structure, the restriction of splitting along either horizonal or vertical may be removed. The GTT partition pattern may be defined as splitting for both horizontal and vertical. Split 901 employs a left split from a vertical TT split and a horizontal BT split of the remaining area. Split 903 employs a bottom split from a horizontal TT split and a vertical BT split of the remaining area. In some examples, the partitioning EQT, FT, and/or GTT partitioning methods may be applied under certain conditions. In other words, when the condition(s) are not satisfied, there is no need to signal the partition types. In another example, the EQT, FT, and/or GTT partitioning methods may be used to replace other partition tree types. In another example, the EQT, FT, and/or GTT partitioning methods may be only used as a replacement for other partition tree types under certain conditions. In one example, the condition may be based on the picture, slice types, block sizes, the coded modes; and/or whether a block is located at a picture, slice, and/or tile boundary. In one example, EQT may be treated in the same way as QT. In this case, when the QT partition tree type is selected, more flags/indications of the detailed quad-tree partition patterns may be further signaled. In some examples, EQT may be treated as additional partition patterns. In one example, the signaling of partitioning methods of EQT, FT, and/or GTT may be conditional. For example, one or more EQP, FT, and/or GTT partitioning methods may not be used in some cases, and the bits corresponding to signal these partitioning methods are not signaled.

Figure 10:
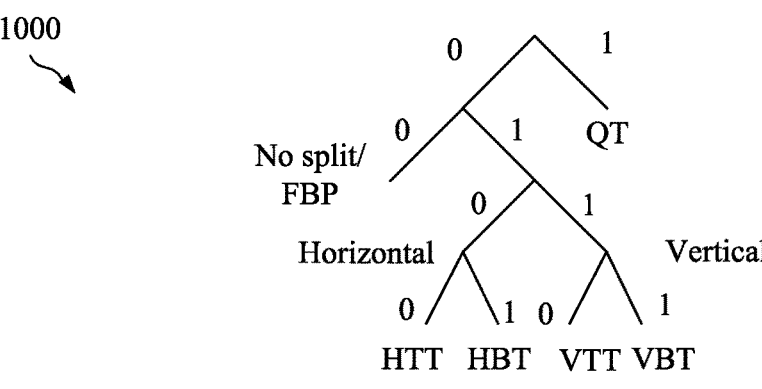
FIG. 10 is a schematic diagram of example boundary partitioning tree.

FIG. 10 is a schematic diagram of example boundary partitioning tree 1000, which is also known as a versatile boundary partition. The boundary partitioning tree 1000 is an example boundary handling method for VVC and/or Audio and Video Coding Standard Workgroup Part three (AVS-3.0). Since the forced quadtree boundary partition solution in VVC is not optimized, the boundary partitioning tree 1000 uses regular block partition syntax to maintain continuity with the CABAC engine as well as to match the picture boundary. The versatile boundary partition obtains the following rules (both encoder and decoder). Since the boundary partitioning tree 1000 uses exactly the same partition syntax of the normal block (non-boundary) for boundaries located at block, the syntax is not changed. If the no split mode is parsed for the boundary CU, the forced boundary partition (FBP) is used to match the picture boundary. After the forced boundary partition is used (non-singling boundary partition), no further partition is performed. The forced boundary partition is described as follows. If the size of block is larger than the maximal allowed BT size, forced QT is used to perform the FBP in the current forced partition level. Otherwise, if the bottom-right sample of current CU is located below the bottom picture boundary and not extended to the right boundary, a forced horizontal BT is used to perform the FBP in the current forced partition level. Otherwise, if the bottom-right sample of current CU is located at the right side of the right picture boundary and not below the bottom boundary, a forced vertical BT is used to perform the FBP in the current forced partition level. Otherwise, if the bottom-right sample of current CU is located at the right side of the right picture boundary and below the bottom boundary, a forced QT is used to perform the FBP in the current forced partition level.

Figures 11, 12:
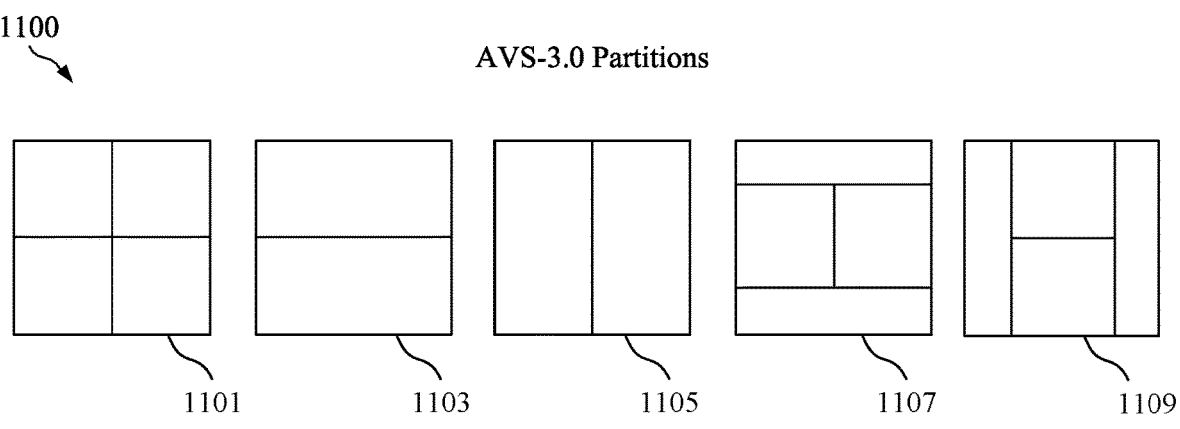
FIG. 11 is a schematic diagram of example partitioning structures used in Audio and Video Coding Standard (AVS) part three (AVS-3.0).
FIG. 12 is a schematic diagram of example Unsymmetrical Quad-Tree (UQT) partitioning structures.

FIG. 11 is a schematic diagram 1100 of example partitioning structures used in Audio and Video Coding Standard (AVS) part three (AVS-3.0). Partitioning in AVS-3.0 is now discussed. The Audio and Video Coding Standard (AVS) Workgroup of China was authorized to be established by the Science and Technology Department under the former Ministry of Industry and Information Technology of People's Republic of China. With the mandate of satisfying the demands from the rapidly growing information industry, AVS is committed to producing technical standards of high quality for compression, decompression, processing, and representation of digital audio and video, and thus providing digital audio-video equipment and systems with high-efficient and economical coding/decoding technologies. AVS can be applied in wide variety of significant information sectors including high-resolution digital broadcast, high-density laser-digital storage media, wireless broad-band multimedia communication and internet broad-band stream media. AVS is one of the second generation of source coding/decoding standards and owns independent Chinese intellectual property rights. Source coding technology primarily addresses the problem of coding and compressing audio and video mass data from initial data and original sources. Hence AVS is known as digital video and audio coding technology, and is the premise of the subsequent digital transmission, storage, and broadcast. Further, AVS serves as a common standard for the digital video and audio industry.

AVS-3.0 employs a QT partitioning 1101, a vertical BT partitioning 1105, a horizontal BT partitioning 1103, and a horizontal extended quad-tree (EQT) partitioning 1107, and a vertical EQT partitioning 1109 to split a largest coding unit (LCU) into multiple CUs. QT partitioning, BT partitioning, and EQT partitioning can all be used for the root, internal nodes, or leaf nodes of the partitioning tree. However, QT partitioning is forbidden after any BT and/or EQT partitioning.

FIG. 12 is a schematic diagram 1200 of example Unsymmetrical Quad-Tree (UQT) partitioning structures. UQT partitioning employs a block with dimensions W×H, which is split into four partitions with dimensions W1×H1, W2×H2, W3×H3 and W4×H4, where W1, W2, W3, W4, H1, H2, H3, H4 are all integers. In one example, and at least one of the partitions has different block size compared to others. In one example, only two of the four partitions may have equal size, and the other two are different with each other and different from the two partitions with equal size. In one example, all the parameters are in the form of power of 2. For example, W1=2N1, W2=2N2, W3=2N3, W4=2N4, H1=2M1, H2=2M2, H3=2M3, H4=2M4. In one example, UQT only splits one partition in vertical direction, for example, H1=H2=H3=H4=H. In one example, in split 1201 W1=W/8, W2=W/2, W3=W/8, W4=W/4, H1=H2=H3=H4=H. This kind of UQT is vertical split and named as UQT1-V. In one example, in split 1203 W1=W/8, W2=W/2, W3=W/4, W4=W/8, H1=H2=H3=H4=H. This kind of UQT is vertical split and named as UQT2-V. In one example in split 1205 W1=W/4, W2=W/8, W3=W/2, W4=W/8, H1=H2=H3=H4=H. This kind of UQT is vertical split and named as UQT3-V. In one example, in split 1207 W1=W/8, W2=W/4, W3=W/2, W4=W/8, H1=H2=H3=H4=H. This kind of UQT is vertical split and named as UQT4-V.

In one example, UQT only splits one partition in horizontal direction, for example, W1=W2=W3=W4=W. In one example, in split 1209 H1=H/8, H2=H/2, H3=H/8, H4=H/4, W1=W2=W3=W4=W. This kind of UQT is horizontal split and named as UQT1-H. In one example, in split 1211
H1=H/8, H2=H/2, H3=H/4, H4=H/8,
W1=W2=W3=W4=W. This kind of UQT is horizontal split
and named as UQT2-H. In one example, in split 1213
H1=H/4, H2=H/8, H3=H/2, H4=H/8,
W1=W2=W3=W4=W. This kind of UQT is horizontal split
and named as UQT3-H. In one example, in split 1215
H1=H/8, H2=H/4, H3=H/2, H4=H/8,
W1=W2=W3=W4=W. This kind of UQT is horizontal split
and named as UQT4-H.

Figure 13:
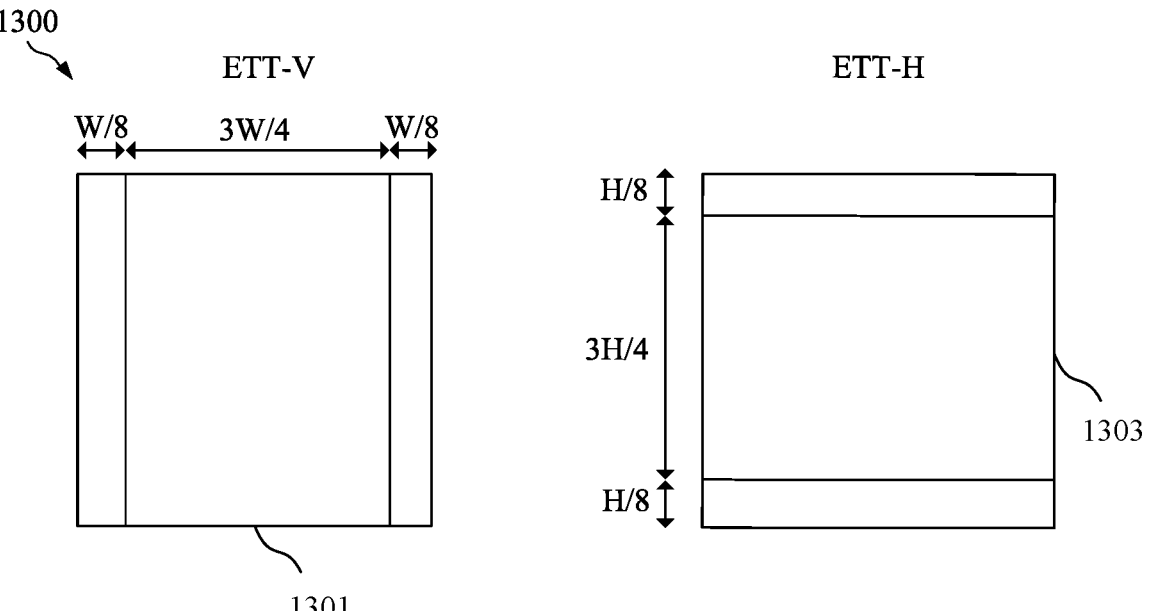
FIG. 13 is a schematic diagram of example Extended Ternary-Tree (ETT) partitioning structures.

FIG. 13 is a schematic diagram 1300 of example ETT
partitioning structures, including an ETT-V split 1301 and
an ETT-H split 1303. When employing ETT, a block with
dimensions width times height (W×H) is split into three
partitions with dimensions W1×H1, W2×H2, and W3×H3.
W1, W2, W3, H1, H2, H3 are all integers. In an example,
and at least one of the parameters is not in the form of power
of 2. W1, W2, and W3 are widths of resulting sub-blocks.
H1, H2, and H3 are heights of resulting sub-blocks. In one
example, W2 cannot be in a form of W2=2N2 with any
positive integer N2. In another example, H2 cannot be in a
form of H2=$2^{N2}$ with any positive integer N2. In one
example, at least one of the parameters is in the form of
power of 2. In one example, W1 is in a form of W1=$2^{N1}$ with
a positive integer N1. In another example, H1 is in a form
of H1=$2^{N1}$ with a positive integer N1.

In one example, ETT only splits one partition in a vertical
direction, for example where W1=a1*W, W2=a2*W, and
W3=a3*W, where a1+a2+a3=1, and where H1=H2=H3=H.
This kind of ETT is vertical split and may be referred to as
ETT-V. In one example, ETT-V split 1301 can be used where
W1=W/8, W2=3*W/4, W3=W/8, and H1=H2=H3=H. In
one example, ETT only splits one partition in horizontal
direction, for example where H1=a1*H, H2=a2*H, and
H3=a3*H, where a1+a2+a3=1, and where W1=W2=W3=W.
This kind of ETT is a horizontal split and may be referred
to as ETT-H. In one example, ETT-H split 1303 can be used
where H1=H/8, H2=3*H/4, H3=H/8, and W1=W2=W3=W.

Figure 14:
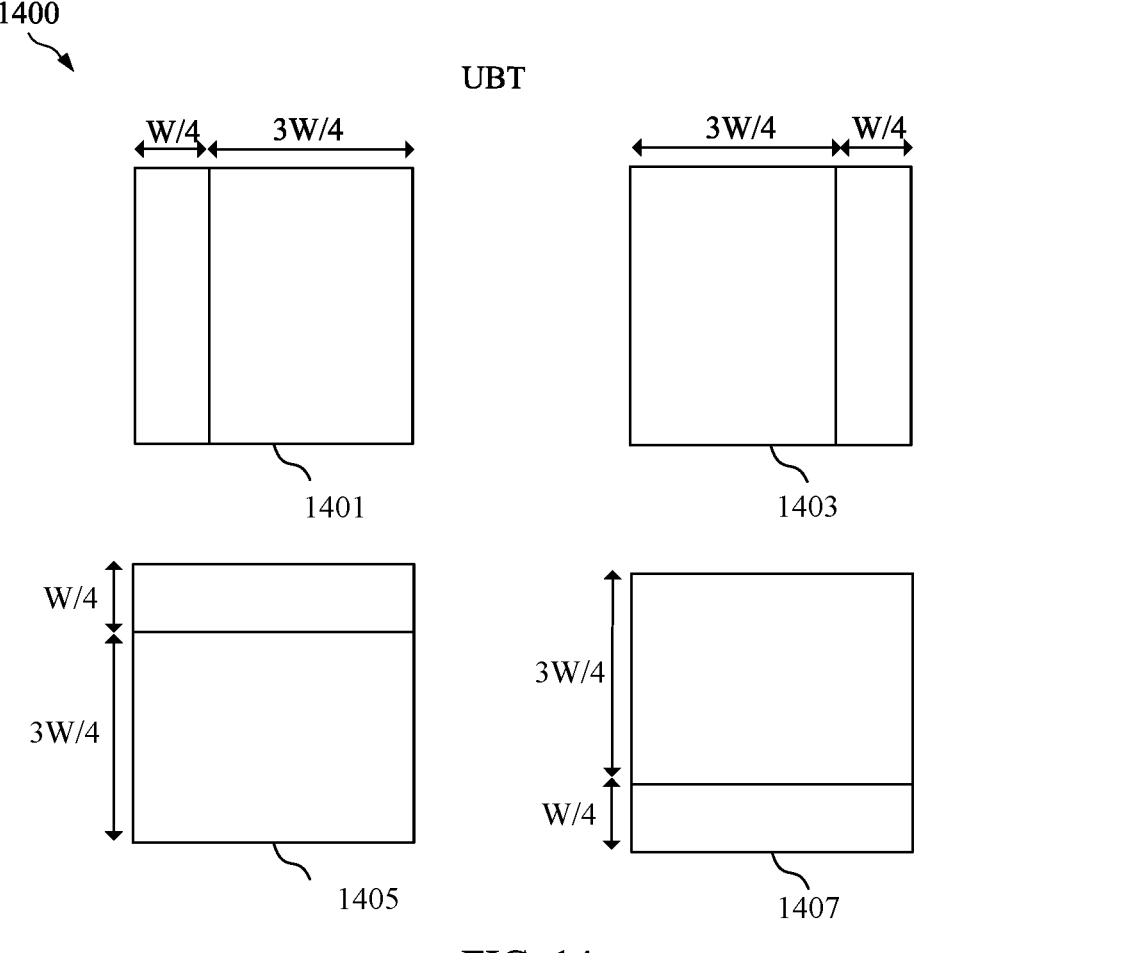
FIG. 14 is a schematic diagram of example ¼ Unsymmetric Binary Tree (UBT) partitioning structures.

FIG. 14 is a schematic diagram 1400 of example ¼ UBT
partitioning structures, which includes vertical UBT (UBT-
V) partitions and horizontal UBT (UBT-H) partitions. A
block of dimensions W×H can be split into two sub-blocks
dimensions W1×H1 and W2×H2, where one of the sub-
blocks is a dyadic block and the other is a non-dyadic block.
Such a split is named as Unsymmetric Binary Tree (UBT)
split. In one example, W1=a×W, W2=(1−a)×W, and
H1=H2=H. In such as case, the partition may be called a
vertical UBT (UBT-V). In one example, a may be smaller
than ½, such as ¼, ⅛, ¹⁄16, ¹⁄32, ¹⁄64, etc. In such a case, the
partition may be called a Type 0 UBT-V, an example of
which is shown as split 1401. In one example, a may be
larger than ½, such as ¾, ⅞, ¹⁵⁄16, ³¹⁄32, ⁶³⁄64, etc. In such a
case, the partition is called a Type 1 UBT-V, an example of
which is shown as split 1403. In one example, H1=a×H,
H2=(1−a)×H, W1=W2=W. In such as case, the partition may
be called a horizontal UBT (UBT-H). In one example, a may
be smaller than ½, such as ¼, ⅛, ¹⁄16, ¹⁄32, ¹⁄64, etc. In such
a case, the partition is called a Type 0 UBT-H, an example
of which is shown as split 1405. In one example, a may be
larger than ½, such as ¾, ⅞, ¹⁵⁄16, ³¹⁄32, ⁶³⁄64, etc. In such a
case, the partition may be called a Type 1 UBT-H, an
example of which is shown as split 1407.

Figure 15:
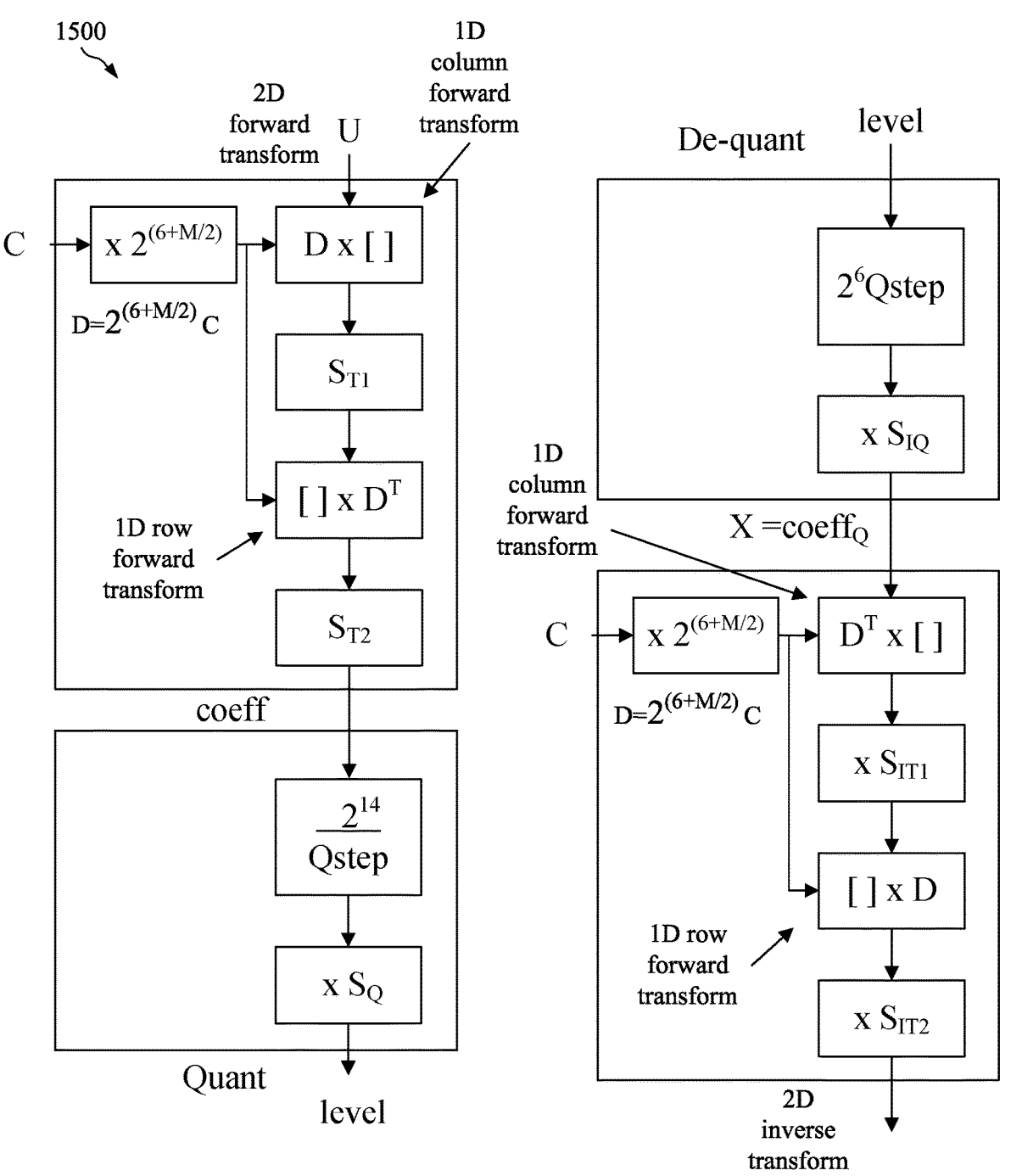
FIG. 15 is a schematic diagram of an example of residual transformation.

FIG. 15 is a schematic diagram 1500 of an example of
residual transformation, for example as used in HEVC. For
example, blocks can be coded according to prediction based
on other blocks. The difference between the prediction from
the reference block(s) and the current block is known as the residual. The residual can be transformed and quantized at
an encoder to reduce the size of the residual data. A
dequantization and inverse transform can be applied at a
decoder to obtain the residual data. The residual data can
then be applied to the prediction to reconstruct the coded
block for display. The schematic diagram 1500 illustrates a
transform process and quantization process at the encoder on
the left and a dequantization process and an inverse trans-
form at the decoder on the right. The transform process for
a N×N block can be formulated as:

$$w_i = \sum_{j=0}^{N-1} u_j c_{ij}$$

where i=0, . . . , N−1. Elements $c_{ij}$ of the DCT transform
matrix C are defined as $$c_{ij} = \frac{A}{\sqrt{N}} \cos\left[\frac{\pi}{N}(j + \frac{1}{2})i\right]$$

where i,j=0, . . . , N−1 and where A is equal to 1 and $2^{1/2}$ for
i=0 and i>0 respectively. Furthermore, the basis vectors $c_i$ of
the DCT are defined as $c_i = [c_{i0}, . . . , c_{i(N-1)}]^T$ i=0, . . . , N−1.

$$M = \log_2(N)$$

$$S_{T1} = 2^{-(B+M-9)}$$

$$S_{T2} = 2^{-(M+6)}$$

B represents the bit-depth.
After the first inverse transform stage: $S_{IT1} = 2^{-(7)}$
After the second inverse transform stage: $S_{IT2} = 2^{-(20-B)}$
For the output sample of the forward transform, coeff, a
straightforward quantization scheme can be implemented as
follows:

$$\text{level} = \left(\left(coeff \times f_{QP\%6} + \text{offset}_Q\right) \gg \frac{QP}{6}\right) \gg shift2$$

$$shift2 = 29 - M - B$$

$$S_Q = 2^{-shift2}$$

$$Qstep(QP) = (2^{1/6})^{QP-4} = G_{QP\%6} \ll (QP/6).$$

$$f = [f_0, f_1, . . . , f_5] = [26214, 23302, 20560, 18396, 16384, 14564].\ \text{Note that}\ f_{QP\%6} \approx 2^{14}/G_{QP\%6}.$$

$$G = [G_0, G_1, . . . , G_5] = [2^{-4/6}, 2^{-3/6}, 2^{-2/6}, 2^{-1/6}, 2^0, 2^{1/6}, 2^0].$$

For a quantizer output, level, the de-quantizer is specified in
the HEVC standard as $$coeff_Q = \left(\left(\text{level} \times \left(g_{QP\%6} \ll \frac{QP}{6}\right)\right) + \text{offset}_{IQ}\right) \gg shift1$$

$$shift1 = (M - 9 + B)$$

$S_{IQ}$ is equal to $2^{-shift1}$.

$$g_{QP\%6} = \text{round}(2^6 \times G_{QP\%6}).$$

$$g = [g_0, g_1, \ldots, g_5] = [40, 45, 51, 57, 64, 71].$$

Shifts and multipliers in schematic diagram 1500 are summarized as follows: Forward transform:

| | Scale Factor |
|---|---|
| First forward transform stage | $2^{(6 + M/2)}$ |
| After the first forward transform stage ($S_{T1}$) | $2^{-(B + M-9)}$ |
| Second forward transform stage | $2^{(6 + M/2)}$ |
| After second forward transform stage ($S_{T2}$) | $2^{-(M + 6)}$ |
| Total scaling for the forward transform | $2^{(15 - B - M)}$ |

Inverse transform:

| | Scale Factor |
|---|---|
| First inverse transform stage | $2^{(6 + M/2)}$ |
| After the first inverse transform stage ($S_{IT1}$) | $2^{-7}$ |
| Second inverse transform stage | $2^{(6 + M/2)}$ |
| After second inverse transform stage ($S_{IT2}$) | $2^{-(20 - B)}$ |
| Total scaling for the inverse transform | $2^{-(15 - B - M)}$ |

In VVC, the process of transform, quantization, de-quantization, and inverse transform is shown in FIG. 18 and is discussed in more detail below. Unlike HEVC, VVC supports rectangular blocks, and hence VVC support blocks where the width and height may be different. Suppose the width and height of a transform block are W and H, respectively, then $$S_{T1} = 2^{-(\lfloor log2 W \rfloor + B - 9)} S_{T2} = 2^{-(\lfloor log2 H \rfloor + 6)}$$

$$S_{T2} = 2^{-(\lfloor log2 H \rfloor + 6)}$$

Shifts and multipliers in FIG. 18 for VVC are modified as follows in comparison to FIG. 15: Forward transform:

| | Scale Factor |
|---|---|
| First forward transform stage | $2^{(6 + \lfloor log^2 W \rfloor/2)}$ |
| After the first forward transform stage ($S_{T1}$) | $2^{-(\lfloor log^2 W \rfloor + B-9)}$ |
| Second forward transform stage | $2^{(6 + \lfloor log^2 H \rfloor/2)}$ |
| After second forward transform stage ($S_{T2}$) | $2^{-(\lfloor log^2 H \rfloor + 6)}$ |
| Total scaling for the forward transform | $2^{15 - B - (\lfloor log^2 W \rfloor + \lfloor log^2 H \rfloor)/2}$ |

Inverse transform:

| | Scale Factor |
|---|---|
| First inverse transform stage | $2^{(6 + \lfloor log^2 W \rfloor/2)}$ |
| After the first inverse transform stage ($S_{IT1}$) | $2^{-7}$ |
| Second inverse transform stage | $2^{(6 + \lfloor log^2 H \rfloor/2)}$ |
| After second inverse transform stage ($S_{IT2}$) | $2^{-(20 - B)}$ |
| Total scaling for the inverse transform | $2^{-(15 - B - (\lfloor log^2 W \rfloor + \lfloor log^2 H \rfloor)/2)}$ |

Compared to HEVC, when $\lfloor \log_2 W \rfloor + \lfloor \log_2 H \rfloor$ is an even number, the same quantization/dequantization factors can be used. If $\lfloor \log_2 W \rfloor + \lfloor \log_2 H \rfloor$ is an odd number, a factor of $2^{1/2}$ is used for compensation at the quantization/dequantization stage.

If $\lfloor \log_2 W \rfloor + \lfloor \log_2 H \rfloor$ is an odd number, f'=[f'0, f'1, . . . , f'5]=[18396,16384,14564,13107,11651,10280] is used instead of f, and g'=[g'0, g'1, . . . , g'5][57,64,72,80,90,102] is used instead of g. Roughly speaking, f'≈f×2−½ and g'≈g×21/2.

Multiple Transform Set (MTS) as used in VVC is now discussed. In addition to DCT type 2 (DCT-II) which is employed in HEVC, a MTS scheme can be used for residual coding of both inter and intra coded blocks. MTS uses multiple selected transforms from the DCT type 8 (DCT-VIII) and/or DST type 7 (DST-VII). The following table shows the basis functions of the selected DST/DCT.

| Transform Type | Basis function $T_i(j)$, i, j = 0, 1, . . . , N − 1 |
|---|---|
| DCT-II (DCT2) | $T_i(j) = \omega_0 \cdot \sqrt{\dfrac{2}{N}} \cdot \cos\left(\dfrac{\pi \cdot i \cdot (2j + 1)}{2N}\right)$ |
| | where, $\omega_0 = \begin{cases} \sqrt{\dfrac{2}{N}} & i = 0 \\ 1 & i \neq 0 \end{cases}$ |
| DCT-VIII (DCT8) | $T_i(j) = \sqrt{\dfrac{4}{2N + 1}} \cdot \cos\left(\dfrac{\pi \cdot (2i + 1) \cdot (2j + 1)}{4N + 2}\right)$ |
| DST-VII (DST7) | $T_i(j) = \sqrt{\dfrac{4}{2N + 1}} \cdot \sin\left(\dfrac{\pi \cdot (2i + 1) \cdot (j + 1)}{2N + 1}\right)$ |

There are two ways to enable MTS. One is explicit MTS, and the other is implicit MTS. Implicit MTS is now discussed. Implicit MTS is a tool in VVC. The variable implicitMtsEnabled is derived as follows. Whether to enable implicit MTS is dependent on the value of a variable implicitMtsEnabled. The variable implicitMtsEnabled is derived as follows. If sps_mts_enabled_flag is equal to 1 and one or more of the following conditions are true, implicitMtsEnabled is set equal to 1: IntraSubPartitionsSplitType is not equal to ISP_NO_SPLIT (that is, ISP is enabled); and cu_sbt_flag is equal to 1 (that is, ISP is enabled) and Max(nTbW, nTbH) is less than or equal to 32. sps_explicit_mts_intra_enabled_flag is equal to 0 (that is, explicity MTS is disabled) and CuPredMode[0][xTbY][yTbY] is equal to MODE_INTRA and lfnst_idx[x0][y0] is equal to 0 and intra_mip_flag[x0][y0] is equal to 0. Otherwise, implicitMtsEnabled is set equal to 0.

The variable trTypeHor specifying the horizontal transform kernel and the variable trTypeVer specifying the vertical transform kernel are derived as follows. If one or more of the following conditions are true, trTypeHor and trTypeVer are set equal to 0 (i.e., DCT2). cIdx is greater than 0 (that is, for a chroma component); and IntraSubPartitionsSplitType is not equal to ISP_NO_SPLIT and lfnst_idx is not equal to 0. Otherwise, if implicitMtsEnabled is equal to 1, the following applies: If cu_sbt_flag is equal to 1, trTypeHor and trTypeVer are specified depending on cu_sbt_horizontal_flag and cu_sbt_pos_flag. Otherwise (cu_sbt_flag is equal to 0), trTypeHor and trTypeVer are derived as follows:

$$\text{trTypeHor} = (\text{nTb}W \geq 4 \ \&\& \ \text{nTb}W \leq 16)?1:0 \qquad (1188)$$

$$\text{trTypeVer} = (\text{nTb}H \geq 4 \ \&\& \ \text{nTb}H \leq 16)?1:0 \qquad (1189)$$

Otherwise, trTypeHor and trTypeVer are specified depending on mts_idx. The variables nonZeroW and non-ZeroH are derived as follows: If ApplyLfnstFlag is equal to 1 and nTbW is greater than or equal to 4 and nTbH is greater than or equal to 4, the following applies:

$$\text{nonZero}W = (\text{nTb}W == 4 \| \text{nTb}H == 4)?4:8 \qquad (1190)$$

$$\text{nonZero}H = (\text{nTb}W == 4 \| \text{nTb}H == 4)?4:8 \qquad (1191)$$

Otherwise, the following applies:

$$nonZeroW=\text{Min}(nTbW,(trTypeHor>0)?16:32) \qquad (1192)$$

$$nonZeroH=\text{Min}(nTbH,(trTypeVer>0)?16:32) \qquad (1193)$$

Explicit MTS is now discussed. In order to control the MTS scheme, one flag is used to specify whether explicit MTS for intra/inter prediction is present in a bitstream. In addition, two separate enabling flags are specified at the SPS level for intra and inter prediction, respectively to indicate whether explicit MTS is enabled. When MTS is enabled at the SPS, a CU level transform index may be signaled to indicate whether MTS is applied or not. Here, MTS is applied only for luma. The MTS CU level index (denoted by mts_idx) is signaled when the following conditions are satisfied: Both width and height smaller than or equal to 32; CBF luma flag is equal to one; Non-TS; Non-ISP; Non-SBT; LFNST is disabled; Non-zero coefficient exists which is not in the DC position (top-left position of a block); and there are no non-zero coefficients outside the top-left 16×16 region.

If 1st bin of mts_idx is equal to zero, then DCT2 is applied in both directions. However, if the 1st bin of the mts_idx is equal to one, then two more bins are additionally signaled to indicate the transform type for the horizontal and vertical directions, respectively. Transform and signal mapping in MTS may be performed as described in the table below. Regarding transform matrix precision, 8-bit primary transform cores are used. Therefore, all the transform cores used in HEVC are maintained, including 4-point DCT-2, DST-7, and 8-point, 16-point, and 32-point DCT-2. Also, other transform cores including 64-point DCT-2, 4-point DCT-8, 8-point, 16-point, and 32-point DST-7, and DCT-8, use 8-bit primary transform cores.

| | | | Intra/inter | | |
|---|---|---|---|---|---|
| $0^{th}$-bin | $1^{st}$-bin | $2^{nd}$-bin | Horizontal | Vertical | mts_idx |
| 0 | | | DCT2 | | 0 |
| 1 | 0 | 0 | DST7 | DST7 | 1 |
| | 0 | 1 | DCT8 | DST7 | 2 |
| | 1 | 0 | DST7 | DCT8 | 3 |
| | 1 | 1 | DCT8 | DCT8 | 4 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained. As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32.

Zero-out in MTS is now discussed. In VVC test model version 8 (VTM8), large block-size transforms, up to 64×64 in size, are enabled, which is primarily useful for higher resolution video, e.g., 1080p and 4K sequences. High frequency transform coefficients of blocks with DCT2 transform applied are zeroed out for the transform blocks with size no smaller than 64 (width, height, or both), so that only the lower-frequency coefficients are retained, all other coefficients are forced to be zeros without being signaled. For example, for an M×N transform block, with M as the block width and N as the block height, when M is no smaller than 64, only the left 32 columns of transform coefficients are kept. Similarly, when N is no smaller than 64, only the top 32 rows of transform coefficients are kept.

High frequency transform coefficients of blocks with DCT8 or DST7 transform applied are zeroed out for the transform blocks with size no smaller than 32 (width, height, or both), so that only the lower-frequency coefficients are retained, all other coefficients are forced to be zeros without being signaled. For example, for an M×N transform block, with M as the block width and N as the block height, when M is no smaller than 32, only the left 16 columns of transform coefficients are kept. Similarly, when N is no smaller than 32, only the top 16 rows of transform coefficients are kept.

Figure 16:
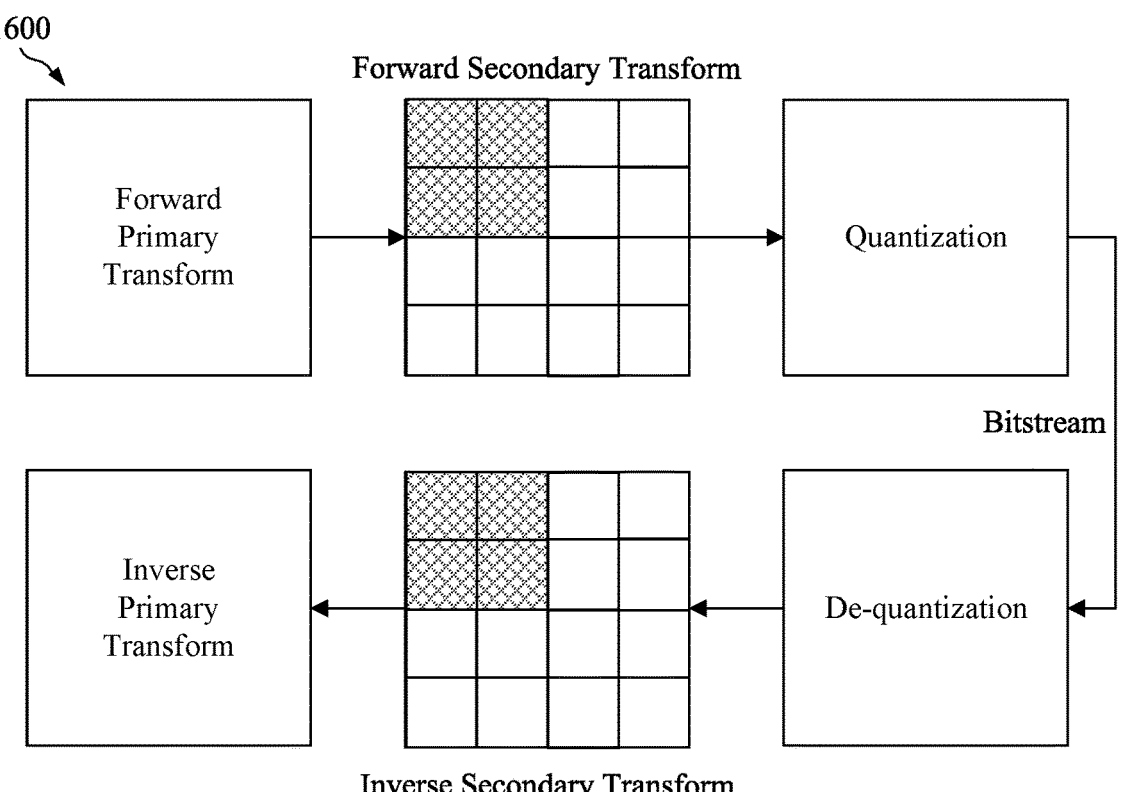
FIG. 16 is a schematic diagram of an example Non-Separable Secondary Transform (NSST) process.

Low frequency non-separable secondary transform (LFNST) is now discussed. FIG. 16 is a schematic diagram 1600 of an example Non-Separable Secondary Transform (NSST) process, as applied in JEM. At an encoder, a forward primary transform is applied to a block of residual data. Then a secondary transform is applied prior to quantization. The result is coded into the bitstream. At the decoder, de-quantization is performed. Then an inverse secondary transform is applied prior to application of an inverse primary transform, which reconstructs the residual for use in decoding the block. In schematic diagram 1600, a 4×4 or 8×8 secondary transform is performed depending on the block size. For example, a 4×4 secondary transform is applied for small blocks (e.g., min (width, height)<8) and 8×8 secondary transform is applied for larger blocks (e.g., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$ as follows: $\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$ The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical, or diagonal). The coefficients with smaller index are placed with the smaller scanning index in the 4×4 coefficient block. There are 35 transform sets in total, and three non-separable transform matrices (kernels) per transform set are used. The mapping from the intra prediction mode to the transform set is pre-defined. For each transform set, the selected non-separable secondary transform candidate is further specified by the explicitly signalled secondary transform index. The index is signalled in a bit-stream once per intra CU after transform coefficients.

A reduced secondary transform for use in LFNST is now discussed. The LFNST may employ a four transform set (instead of 35 transform sets). 16×64 (may be further reduced to 16×48) and 16×16 matrices are employed for 8×8 and 4×4 blocks, respectively. For notational convenience, the 16×64 (may further be reduced to 16×48) transform is denoted as LFNST8×8 and the 16×16 one as LFNST4×4.

Figure 17:
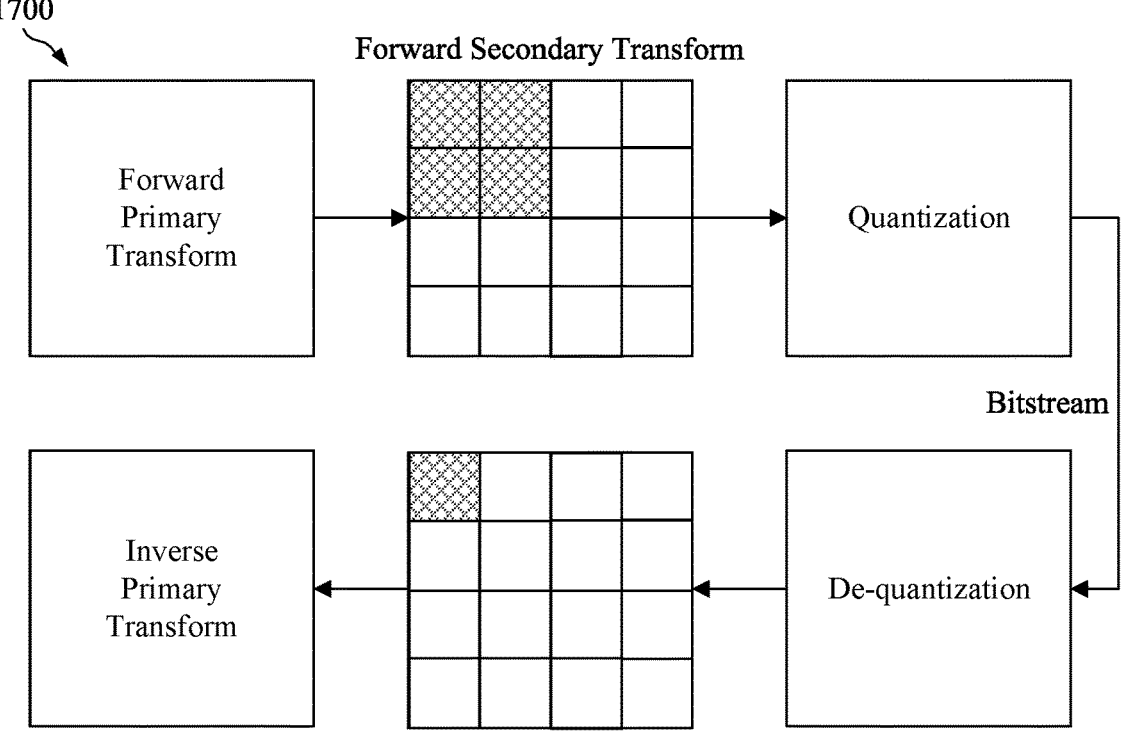
FIG. 17 is a schematic diagram of an example Low frequency non-separable secondary transform (LFNST) process with a reduced secondary transform.

FIG. 17 is a schematic diagram 1700 of an example LFNST process with a reduced secondary transform. At an encoder, a forward primary transform is applied to a block of residual data. Then a secondary transform is applied prior to quantization. The result is coded into the bitstream. At the decoder, de-quantization is performed. Then an inverse secondary transform is applied prior to application of an inverse primary transform, which reconstructs the residual for use in decoding the block. In schematic diagram 1700, 16 coefficients result from a 4×4 forward reduced secondary transform, and 64 coefficients result from a 8×8 forward reduced secondary transform. Further, a 4×4 or an 8×8 inverse reduced secondary transform is applied to 8 or 16 coefficients, respectively.

LFNST computation is now discussed. The idea of a Reduced Transform (RT) is to map an N dimensional vector to an R dimensional vector in a different space, where R/N (R<N) is the reduction factor. The RT matrix is an R×N matrix as follows:

$$T_{RxN} = \begin{bmatrix} t_{11} & t_{12} & t_{13} & \cdots & t_{1N} \\ t_{21} & t_{22} & t_{23} & \cdots & t_{2N} \\ \vdots & \vdots & \vdots & \ddots & \vdots \\ t_{R1} & t_{R2} & t_{R3} & \cdots & t_{RN} \end{bmatrix}$$

where the R rows of the transform are R bases of the N dimensional space. The inverse transform matrix for RT is the transpose of the corresponding forward transform. The forward and inverse RT are depicted in FIG. 18.

FIG. 18 is a schematic diagram 1800 of another example of residual transformation, for example as used in VVC. Schematic diagram 1800 is similar to schematic diagram 1500, but employs a reduced transform. The residual can be transformed by a reduced transform T and quantized at an encoder to creates coefficients, which represent the residual data in a compressed form. A dequantization and inverse transform Tt with a reduced inverse transform can be applied at a decoder to convert the coefficients back into the residual data. The residual data can then be applied to the prediction to reconstruct the coded block for display.

In an example, the LFNST 8×8 with a reduction factor of 4 (¼ size) is applied. Hence, instead of 64×64, which results from a 8×8 non-separable transform matrix size, a 16×64 direct matrix is used. In other words, the 64×16 inverse LFNST matrix is used at the decoder side to generate core (primary) transform coefficients in the 8×8 top-left regions. The forward LFNST8×8 uses 16×64 (or 8×64 for 8×8 block) matrices so that the transform produces non-zero coefficients only in the top-left 4×4 region within the given 8×8 region. In other words, when LFNST is applied the 8×8 region except the top-left 4×4 region has only zero coefficients. For LFNST4×4, 16×16 (or 8×16 for 4×4 block) direct matrix multiplication is applied.

An inverse LFNST is conditionally applied when the following two conditions are satisfied: block size is greater than or equal to the given threshold (W>=4 && H>=4); and transform skip mode flag is equal to zero. If both W and H of a transform coefficient block is greater than 4, then the LFNST8×8 is applied to the top-left 8×8 region of the transform coefficient block. Otherwise, the LFNST4×4 is applied on the top-left min(8, W)×min(8, H) region of the transform coefficient block. If LFNST index is equal to 0, LFNST is not applied. Otherwise, LFNST is applied, with a kernel chosen based on the LFNST index. The LFNST selection method and coding of the LFNST index are explained below. Furthermore, LFNST is applied for intra CUs, in both intra and inter slices, and for both luma and chroma components. If a dual tree is enabled, LFNST indices for luma and chroma components are signaled separately. For inter slice (the dual tree is disabled), a single LFNST index is signaled and used for both luma and chroma components.

Intra Sub-Partitions (ISP) is an example intra prediction mode. When ISP mode is selected, LFNST is disabled and the LFNST index is not signaled. This is because performance improvements are marginal even when LFNST is applied to every feasible partition block in this case. Furthermore, disabling LFNST for ISP-predicted residual reduces encoding complexity.

LFNST selection is now discussed. A LFNST matrix is chosen from four transform sets, each of which comprises two transforms. Which transform set is applied is determined from intra prediction mode as the follows. When one of three CCLM modes is indicated, transform set 0 is selected. Otherwise, the transform set selection is performed according to the table below.

| IntraPredMode | Transform set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The indices to access the Table, denoted as IntraPredMode, have a range of [−14, 83], which is a transformed mode index used for wide angle intra predictions.

LFNST matrices of reduced dimension is now discussed. FIG. 19 is a schematic diagram 1900 of an example forward LFNTS 8×8 process with a 16×48 matrix. As shown, a block of N×M residual (where N and M are greater than or equal to 8) is obtained as a difference between a prediction block and a current block. A two dimensional (2D) forward primary transform is applied to the N×M residual to create a block of M×N primary coefficients. Reference is particularly made to the top left corner coefficients from the block of M×N primary coefficients. These coefficients are grouped in three blocks of 4×4 primary coefficients. In contrast with other processes, application of the secondary transform includes application of 16×48 matrices instead of 16×64 with the same transform set configuration, denoted as the kernel. Each of the matrices takes a 48×1 vector as input data. The 48×1 vector is created from three blocks of 4×4 primary coefficients from the top-left 8×8 block from the M×N primary coefficients. This excludes the right-bottom 4×4 block as shown in schematic diagram 1900. Accordingly, application of the forward secondary transform results in a 4×4 block of secondary coefficients, two 4×4 blocks of zero coefficients, a M−8×8 block of top-right primary coefficients, a 8×(N−8) block of bottom-left primary coefficients, and a block of (M−8)×(N−8) bottom-right primary coefficients. The 4×4 block of secondary coefficients is generated from a 16×1 vector created by applying the 16×48 matrices to the 48×1 vector from the top left group of 4×4 primary coefficients.

LFNST Signaling is now discussed. The forward LFNST 8×8 with R=16 uses 16×64 matrices so that non-zero coefficients are only produced in the top-left 4×4 region within the given 8×8 region. In other words, when LFNST is applied, all of the 8×8 region, except for the top-left 4×4 region, generates only zero coefficients. As a result, the LFNST index is not coded when any non-zero element is detected within the 8×8 block region other than top-left 4×4 (which is depicted in FIG. 20.) This is because the presence of a non-zero coefficient implies that LFNST was not applied. In such a case, the LFNST index is inferred to be zero.

FIG. 20 is a schematic diagram 2000 of an example scanning mechanism used to support signaling of LFNTS. The forward LFNST 8×8 matrix can be applied to an 8×8 block as shown. The LFNST 8×8 matrix creates non-zero elements in the top left 4×4 block and all zero elements in the top right, bottom left, and bottom right 4×4 blocks. The scanning mechanism can scan the bottom right, top right, and bottom left 4×4 blocks in the order depicted in schematic diagram 2000. This scan reviews for non-zero coefficients. If a non-zero coefficient is found in these areas, a LFNST 8×8 matrix with R=16 was not used. In such a case, the LFNST index is not signaled in the bitstream and can be inferred to be zero at the decoder.

The zero-out range is now discussed. Usually, before applying the inverse LFNST on a 4×4 sub-block, any coefficient in the 4×4 sub-block may be non-zero. However, a constraint may be applied that, in some cases, some coefficients in the 4×4 sub-block must be zero before the inverse LFNST is applied on the sub-block. Let nonZeroSize be a variable. A rule may require that any coefficient with the index no smaller than nonZeroSize must be zero when the coefficient is rearranged into a 1-D array before application of the inverse LFNST. When nonZeroSize is equal to 16, there is no zero-out constraint on the coefficients in the top-left 4×4 sub-block. When the current block size is 4×4 or 8×8, nonZeroSize is set equal to 8. For other block dimensions, nonZeroSize is set equal to 16.

Enhanced intra MTS in the Enhance Compression Model version 2 (ECM-2.0) used for VVC is now discussed. In some processes, only DST7 and DCT8 transform kernels are utilized for intra and inter coding. In other processes, additional primary transforms including DCT5, DST4, DST1, and identity transform (IDT) are also used. MTS set can be made dependent on the TU size and intra mode information. Up to 16 different TU sizes are considered. For each TU size, different transform kernels are selected depending on intra mode information. For angular modes, a joint symmetry over TU shape and intra prediction is considered. For the wide-angle modes the nearest angular mode is used for the transform set determination.

Extended LFNST in ECM-2.0 is now discussed. In ECM-2.0, LFNST4, LFNST8, and LFNST16 are defined to indicate LFNST kernel sets, which are applied to 4×N/N×4 (N≥4), 8×N/N×8 (N≥8), and M×N (M, N≥16), respectively. The forward LFNST is applied to top-left low frequency region, which is called a Region-Of-Interest (ROI). When LFNST is applied, primary-transformed coefficients that exist in the region other than ROI are zeroed out in a manner similar to the VVC standard.

FIG. 21 is a schematic diagram 2100 of an example ROI for LFNST 16. The ROI includes the six 4×4 sub-blocks depicted by cross hatching. These six 4×4 sub-blocks are in consecutive scan order. Since the number of input samples is 96, a transform matrix for forward LFNST16 can be R×96. R is chosen to be 32 in this example. 32 coefficients (two 4×4 sub-blocks) are generated from the forward LFNST16. These 32 coefficients are placed in coefficient scan order.

FIG. 22 is a schematic diagram 2200 of an example ROI for LFNST 8. Schematic diagram 2200 includes a first example forward LFNST8 matrix 2201 and a second example forward LFNST8 matrix 2203. Compared with the forward LFNST8 matrix 2201 as used in VVC, forward LFNST8 matrix 2203 further includes the bottom-right 4×4 sub-block. The forward LFNST8 matrices can be R×64 and R is chosen to be 32. The generated coefficients are located in the same manner as with LFNST16.

The following are example technical problems solved by disclosed technical solutions. Dyadic dimensions describe a case where the width and height of a block must be in a form a 2N wherein N is a positive integer. Transform and quantization mechanisms should be modified to adapt to the blocks with non-dyadic dimensions.

Figure 23:
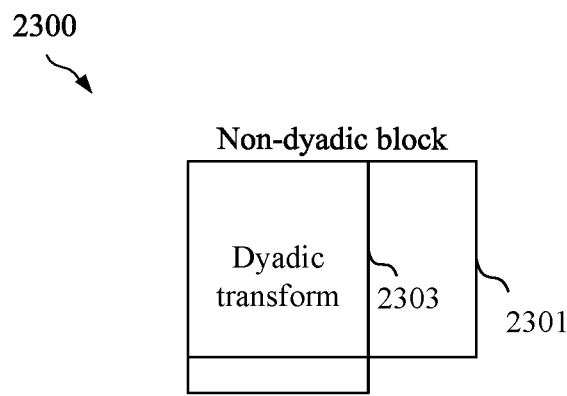
FIG. 23 is a schematic diagram of an example dyadic transform applied to a non-dyadic block.

FIG. 23 is a schematic diagram of an example dyadic transform 2303 applied to a non-dyadic block 2301. A non-dyadic block 2301 is a block of residual data, also known as residual and/or residuals, with at least one side with containing a dimension that cannot be expressed as a power of two. In most video coding systems, blocks are required to be dyadic (all sides have dimensions that are a power of two). As such, transforms are designed to be dyadic transforms 2303. A transform contains a transform function that converts residual inside the space covered by the transform into coefficients, which can be included in a bitstream using less data that the raw residual data. A dyadic transform 2303 is a transform with all sides including dimensions that can be expressed as a power of two. As shown, a dyadic transform 2303 cannot evenly cover all the residual in a non-dyadic block 2301. Accordingly, non-dyadic blocks 2301 do not function correctly in most video coding systems because the residual in the dyadic block 2301 is not completely covered by the dyadic transform 2303 and/or the dyadic transform 2303 convers area that contains no data and hence returns mathematically incorrect results.

Disclosed herein are mechanisms to address one or more of the problems listed above. For example, transforms are sized to be dyadic and are sized for application to dyadic blocks. As such, a transform may not function properly when applied to a non-dyadic block. An item (e.g., block or transform) is dyadic when all edges have sizes that can be expressed as a power of two and is non-dyadic when at least one edge has a size that cannot be expressed as a power of two. The present disclosure addresses these issues. In one example, transforms are disallowed for non-dyadic blocks. For example, residual for non-dyadic blocks can be set to zero, not transformed, and not signaled. Residual is any difference between a prediction and a block being coded. In this case, syntax related to transforming residual is not signaled in the bitstream for any non-dyadic block. In other examples, transforms can be applied to non-dyadic blocks. For example, a zero-out transform can be applied to zero-out all residual coefficients that are outside a region in the top left corner of the non-dyadic block. The region can be sized to be dyadic for application of a further dyadic transform. Also, the residual in the top left corner has the greatest impact on image quality, and zeroing other residual reduces the impact of residual loss. In another example, the non-dyadic block can be padded to fit the dyadic transform. In another example, the non-dyadic block can be split into transform units that are dyadic for application of dyadic transforms. In another example, extra elements can be added to the transform to resize the transform into a shape that fits the non-dyadic block. In some examples, primary and/or secondary transforms can be allowed or disallowed for non-dyadic blocks. For example, MTS can be disallowed for non-dyadic blocks or different transforms used in MTS can be applied to dyadic and non-dyadic blocks, and bitstream signaling can be modified accordingly. In an example, LFNST can be disallowed for non-dyadic blocks or specific LFNST can be employed. In an example, LFNST can be applied to a non-dyadic group of coefficients. In an example, specified transforms can be disallowed for blocks with predetermined sizes. In an example, specified transforms can be disallowed for use with chroma blocks. In an example, specified transforms can be disallowed for blocks predicted by certain predetermined intra prediction mechanisms.

Accordingly, to address the problems mentioned above, several methods are disclosed to handle the issues caused by transforms and quantization mechanisms when applied to non-dyadic blocks as discussed above. The methods result in achieving better coding performance.

The detailed embodiments below should be considered as examples to explain general concepts. These embodiments should not be interpreted in a narrow way. Furthermore, these embodiments can be combined in any manner. In the following discussion, QT, BT, TT, UQT, and ETT may refer to QT split, BT split, TT split, UQT split and ETT split, respectively. In the following discussion, a block is a dyadic block if both width and height is a dyadic number, which is in a form of a $2^N$ with N being a positive integer. In the following discussion, a block is a non-dyadic block if at least one of width and height is a non-dyadic number, which cannot be represented in a form of a $2^N$ with N being a positive integer. In one example, the block could be a block associated with one color component (e.g., a coding block/transform block/prediction block) or the blocks may be associated with two or three color components (e.g., a coding unit/transform unit/prediction unit). In the following discussion, split and partitioning have the same meaning.

Example 1

In one example, transform coding may be disabled for a first block of dimensions width (W) times height (H) when at least one of W and H is a non-dyadic number.

Example 2

In one example, all residuals for the first block must be zero. In such a case, coded block flags (cbf) are not signaled for the first block and inferred to be zero. In such a case, residuals are not signaled for the first block and inferred to be zero. In such a case, a syntax element (e.g., cu_coded_flag in VVC) specifying whether the transform tree or transform unit related syntax is present for the first block is not signaled for the first block and inferred to be zero. Furthermore, an indication of applying different transform matrices or not and/or an indication of which transform matrix should be applied e.g., primary transform matrix, secondary transform matrix, rotation transform) is not signaled. In one example, a transform skip may be applied for the first block. In one example, block-based delta pulse code modulation (BDPCM) mode may be applied for the first block. In one example, palette mode may be applied for the first block.

Example 3

In one example, for a first block of dimensions W×H wherein at least one of W and H is a non-dyadic number, one or multiple transforms with dimensions different from W×H may be applied on it.

Example 4

In one example, at least one zero-out transform can be applied on the first block. In one example, for a coefficient C(i,j) with i from 0 to W−1 and j from 0 to H−1, the coefficients are forced to be zero and not to signaled if i>=W1 or j>=H1, wherein W1<=W and H1<=H. In other words, only coefficients in the top-left W1×H1 rectangular region are signaled to the decoder, with all other coefficients set to be zero. In one example, W1 is equal to $2^{\lfloor log_2 W \rfloor}$. In one example, H1 is equal to $2^{\lfloor log_2 W \rfloor}$.

Example 5

In one example, at least one padded transform can be applied on the first block. A padded transform refers to a transform (or inverse-transform) on a block with padded values.

Example 6

In one example, a transformed block with dimensions W1×H1 may be signaled, with W1>=W and H1>=H. In one example, W1 is equal to $2^{\lfloor log_2 W \rfloor}$. In one example, H1 is equal to $2^{\lfloor log_2 W \rfloor}$. A residual value R(i,j) before transform with i from W to W1-1 or j from H to H1-1 is padded from residual values R'(i,j)s with i from 0 to W−1 and j from 0 to H−1. In one example, R(i,j) is padded as a fixed value, such as 0, or 2B−1, wherein B is the bit-depth. In one example, R(i,j) is padded by duplicated padding. In one example, R(i,j) is padded by extrapolation padding. In one example, R(i,j) is set equal to R'(i', j'). In one example, i'=I-i, j'=j, where I is a horizontal mirroring axis, such as I=2 W−1. In one example, j'=J-j, i'=i, where J is a vertical mirroring axis, such as J=2H−1. In one example, i'=I-i, j'=J-j, where I is a horizontal mirroring axis and J is a vertical mirroring axis, such as I=2 W−1 and J=2H−1.

Example 7

In one example, the first block is split into multiple transform units (TUs). Each TU is transformed, inverse-transformed, signaled, and parsed individually. In one example, at least the dimensions of one TU are dyadic numbers. In one example, dimensions of all TUs are dyadic numbers.

Example 8

In an example, a transform with dimensions of W×H may be applied on the first block. A transform matrix with M×M elements wherein M is a non-dyadic number allowed for W and/or H may be stored for transform and/or inverse transform for M-point transforms. The transform may be any transform such as DCT-2, DCT-8 and DST-7. Each stored element may be an integer. The precision of the integer may be the same as the precision of integers stored for transform on dyadic transform.

Example 9

In an example, a primary transform (e.g., the Multiple Transform Selection (MTS)) can be applied on a first block of dimensions W×H wherein at least one of W and H is a non-dyadic number.

Example 10

In one example, MTS may comprise other transforms besides DCT-2, DST-7 and DCT-8, such as DCT-5, DST-4, DST-1 and IDT.

Example 11

In an example, primary transform (e.g., the MTS) may not be used for a non-dyadic block. In one example, only one kind of transform may be used for a non-dyadic block, such as DCT-2 or DST-7.

Example 12

In one example, the transform can be selected with the same rule for a non-dyadic block and a dyadic block. In one example, the set of allowed transforms for a non-dyadic block with dimension equal to W×H may be same as that used for a dyadic block with dimension equal to $2^K \times 2^L$ wherein K=Floor(log 2(W)) and L=Floor(log 2(H)). In one example, the transform can be selected explicitly with the same rule for a non-dyadic block and a dyadic block. In one example, the transform can be selected implicitly with the same rule for a non-dyadic block and a dyadic block.

Example 13

In one example, MTS may be conducted with different rules for a non-dyadic block and a dyadic block. For example, different transform candidates may be used for a dyadic block and a non-dyadic block. For example, the number of transform candidates for a non-dyadic block may be less than that for a dyadic block. For example, the number of transform candidates for a non-dyadic block may be more than that for a dyadic block. A transform candidate for a dyadic block may not be a candidate for a non-dyadic block. For example, DCT-8 may not be a transform candidate for a non-dyadic block. A transform candidate for a non-dyadic block may not be a candidate for a dyadic block. In another example, DCT-5 and/or DST-4 and/or DST-1 and/or IDT may not be a candidate for a non-dyadic block. In one example, signaling of the transform index may depend on whether a transform is a candidate for a non-dyadic block or not. For example, the codeword indicating a candidate which is not used for a non-dyadic block may not be signaled for the non-dyadic block.

Example 14

In an example, a secondary transform (e.g., LFNST) can be applied on a first block of dimensions W×H wherein at least one of W and H is a non-dyadic number. In an example, a secondary transform (e.g., LFNST) may not be applied to the first block. In one example, only one LFNST kernel in a selected LFNST set is allowed for the first block (e.g., lfnst_idx equal to 0). In one example, LFNST may be conducted with different rules for a non-dyadic block and a dyadic block. In one example, a W1×H1 LFNST may be applied to the top-left W1×H1 region of the first block after the primary transform at encoder, and/or before the primary inverse-transform at decoder, where W1×H1 is not equal to 4×4 or 8×8.

Example 15

Whether and/or how to apply the above examples may depend on W and/or H for a first block of dimensions W×H where at least one of W and H is a non-dyadic number. For example, a transform may not be applied when W and/or H are equal to some specific values. For example, MTS may not be applied when W and/or H are equal to some specific values. For example, LFNST may not be applied when W and/or H are equal to some specific values. For example, the M×M (such as M=16) LFNST cannot be applied on a dyadic block with width or height less than M (such as 6 or 12 in case of M=16).

Example 16

Whether and/or how to apply the above examples may depend on decoded information (e.g., color components, prediction method) for a first block of dimensions W×H where at least one of W and H is a non-dyadic number. For example, transform may not be applied on the first block for a specific color component such as Cb or Cr. For example, MTS may not be applied on the first block for a specific color component such as Cb or Cr. For example, LFNST may not be on the first block for a specific color component such as Cb or Cr.

Whether and/or how to apply the above examples may depend on prediction method for a first block of dimensions W×H, where at least one of W and H is a non-dyadic number. For example, MTS may be not be applied on the first block for a specific prediction method such as ISP/MIP/AFFINE/GEO. For example, LFNST may be not be applied on the first block for a specific prediction method such as ISP/MIP/AFFINE/GEO. For example, SBT may be not be applied on the first block for a specific prediction method such as AFFINE/GEO.

Figure 24:
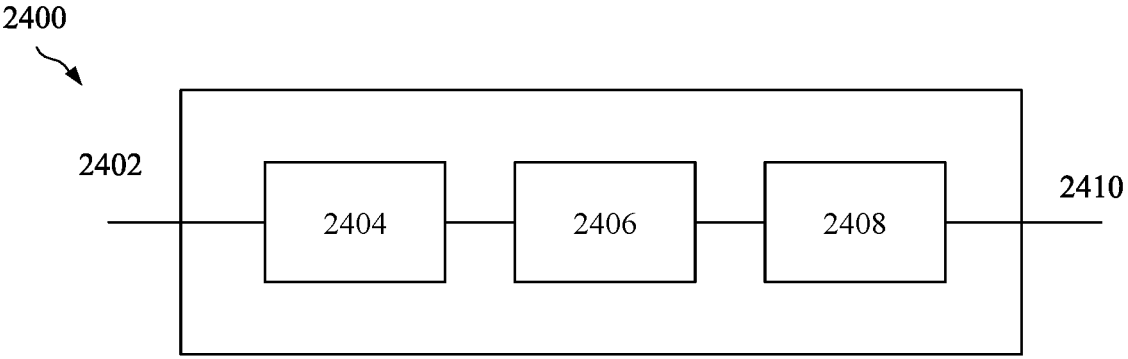
FIG. 24 is a block diagram showing an example video processing system.

FIG. 24 is a block diagram showing an example video processing system 2400 in which various techniques disclosed herein may be implemented. Various implementations may include some or all of the components of the system 2400. The system 2400 may include input 2402 for receiving video content. The video content may be received in a raw or uncompressed format, e.g., 8 or 10 bit multi-component pixel values, or may be in a compressed or encoded format. The input 2402 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2400 may include a coding component 2404 that may implement the various coding or encoding methods described in the present document. The coding component 2404 may reduce the average bitrate of video from the input 2402 to the output of the coding component 2404 to produce a coded representation of the video. The coding techniques are therefore sometimes called video compression or video transcoding techniques. The output of the coding component 2404 may be either stored, or transmitted via a communication connected, as represented by the component 2406. The stored or communicated bitstream (or coded) representation of the video received at the input 2402 may be used by a component 2408 for generating pixel values or displayable video that is sent to a display interface 2410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 25:
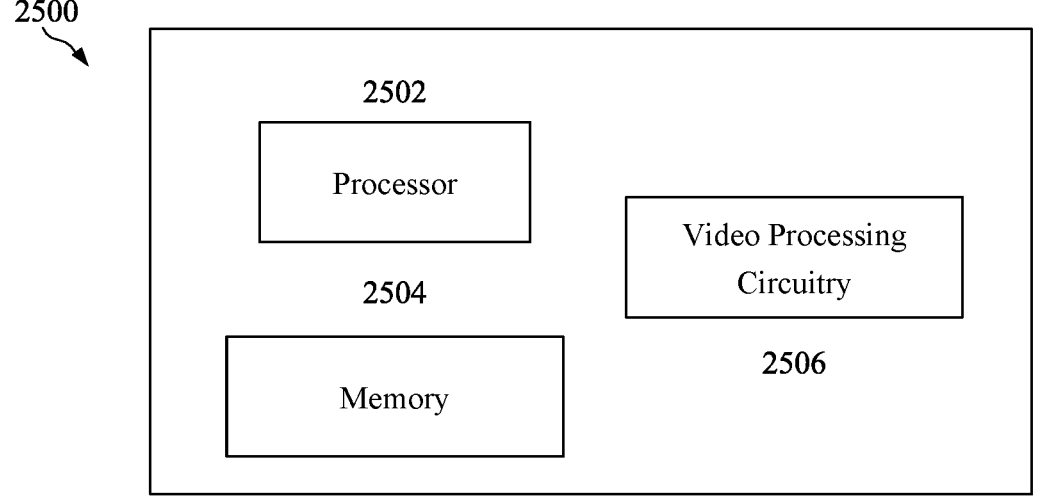
FIG. 25 is a block diagram of an example video processing apparatus.

FIG. 25 is a block diagram of an example video processing apparatus 2500. The apparatus 2500 may be used to implement one or more of the methods described herein. The apparatus 2500 may be embodied in a smartphone, tablet, computer, Internet of Things (IoT) receiver, and so on. The apparatus 2500 may include one or more processors 2502, one or more memories 2504 and video processing circuitry 2506. The processor(s) 2502 may be configured to implement one or more methods described in the present document. The memory (memories) 2504 may be used for storing data and code used for implementing the methods and techniques described herein. The video processing circuitry 2506 may be used to implement, in hardware circuitry, some techniques described in the present document. In some embodiments, the video processing circuitry 2506 may be at least partly included in the processor 2502, e.g., a graphics co-processor.

FIG. 26 is a flowchart for an example method 2600 of video processing. The method 2600 includes performing transform coding of residual for a block at step 2602. Specifically, the transform coding is performed even when the block comprises a side that is non-dyadic, and is hence a non-dyadic block. At step 2606, a conversion is performed between a visual media data and a bitstream based on the block. As noted above, applying a dyadic transform to non-dyadic block results in mathematical error. Accordingly, one or more of the following approaches can be employed to correct such issues. For example, the transform coding process can include applying a zero-out transform to the block. The zero-out transform is a transform that sets data to zero. Accordingly, applying the zero-out transform can include setting all residual coefficients outside of a top left rectangular region of the block to zero. The top left rectangular region may have a width (W1) and height (H1), where W1 is equal to $2^{\lfloor log_2 W \rfloor}$ and H1 is equal to $2^{\lfloor log_2 W \rfloor}$. For example, coefficients in a block sized as width (W) by height (H) can be denoted as C(i,j) with i from 0 to W−1 and j from 0 to H−1. Such coefficients can be set to zero when i>=W1 or j>=H1. This approach may leave an area of residual in the top left corner of the nondyadic block that is dyadic, and hence can be transformed and encoded into a bitstream. It should be noted that the human eye is better at perceiving lower frequency changes than high frequency changes. Further, the transform process generally sorts higher frequency data toward the top left and lower frequency data toward the bottom right. The zero-out transform is a lossy process, but maintains residual data at the top left to ensure the least amount of reduction in the image quality.

In another example, the block is padded to a dyadic size to fit the dyadic transform. The block may have dimensions of width (W) times height (H), but can be padded until reaching a width (W1) and height (H1) where W1>=W and H1>=H. For example, W1 can be equal to $2^{\lfloor log_2 W \rfloor}$ and H1 can be equal to $2^{\lfloor log_2 W \rfloor}$. The padded block is dyadic and hence can be transformed. The non-dyadic block can be padded by obtaining data from inside the block and adding such data to the outer edge of the block. Such padding can include fixed value padding (based on bit depth), duplicated padding, extrapolation padding, application of a horizontal mirroring axis, application of a vertical mirroring axis, or combinations thereof. A mirroring axis include positioning an axis (horizontal or vertical) and using symmetry to select padding from the opposite side of the axis.

In another example, the dyadic block can be split into various transform units. The transform units may be sized to be dyadic. Accordingly, the transform units can be individually transformed to cover all of the residual.

In another example, a non-dyadic transform can be used to transform the non-dyadic block. For example, a transform matrix with M×M elements where M is a non-dyadic number allowed for W and/or H may be stored for transform and/or inverse transform for M-point transforms. The transform may be any transform such as discrete cosine transform (DCT) type two (DCT-2), DCT type eight (DCT-8), and discrete sine transform (DST) type seven (DST-7). Each stored element may be an integer. The precision of the integer may be the same as the precision of integers stored for transform on dyadic transform.

In another example, transform coding of the block may include application of a non-dyadic primary transform, such as a multiple transform selection (MTS) transform. A MTS transform is a mechanism that selects the best transform from a group of transforms, such as DCT-2, DCT-8, DST-7, DCT type five (DCT-5), DST type four (DST-4), DST type 1 (DST-1), identity transform (IDT), or combinations thereof. In another example, MTS can be disallowed for application to a non-dyadic block. For example, a single transform, such as DCT-2 or DST-7 can be exclusively used for non-dyadic blocks.

In one example, rules for primary transform selection for non-dyadic block may be the same and/or similar to rules for primary transform selection of dyadic blocks. In one example, the set of allowed transforms for a non-dyadic block with dimension equal to W×H may be same as that used for a dyadic block with dimension equal to $2^K \times 2^L$ wherein K=Floor(log 2(W)) and L=Floor(log 2(H)). In one example, the transform can be selected explicitly with the same rule for a non-dyadic block and a dyadic block. In one example, the transform can be selected implicitly with the same rule for a non-dyadic block and a dyadic block.

In another example, transform selection rules (e.g., for MTS) for non-dyadic blocks and transform selection rules for dyadic blocks can be different. For example, different transform candidates may be used for a dyadic block and a non-dyadic block. Further, the number of transform candidates for a non-dyadic block may be greater than or less than that for a dyadic block. In some examples, a transform candidate for a dyadic block may not be a candidate for a non-dyadic block, or vice versa. For example, DCT-8 may not be a transform candidate for a non-dyadic block. In an example, DCT-5, DST-4, DST-1, IDT or combinations thereof, are candidates for dyadic blocks and are not candidates for non-dyadic blocks. In one example, signaling of transform indices may depend on whether a transform is a candidate for a non-dyadic block or not. In an example, a codeword indicating a transform for the block need not include a combination for any transform candidates that are disallowed for non-dyadic blocks.

In an example, transform coding of the non-dyadic block can include application of a secondary transform, such as a low frequency non-separable secondary transform (LFNST) transform. In another example, the secondary transform can be disallowed for use with the non-dyadic block. In an example, a single kernel from a LFNST set is allowed for non-dyadic blocks. In another example, LFNST may be conducted with different rules for a non-dyadic block and a dyadic block. For example, LFNST can be applied to a region in a non-dyadic block with a width (W1) and a height (H1) where W1×H2 is not 4×4 and is not 8×8.

In an example, whether and/or how to apply a transform may depend on whether the block is dyadic or non-dyadic. For example, a transform, such as MTS and/or LFNST, can be disallowed for application to a non-dyadic block when the non-dyadic block has a width (W) or a height (H) equal to a predetermined value. In an example, the M×M (such as M=16) LFNST cannot be applied on a dyadic block with width or height less than M (such as 6 or 12 in case of M=16).

In an example, a transform, such as MTS and/or LFNST, is disallowed for application to a non-dyadic block when the non-dyadic block contains a color component, such as Cb or Cr. In a specific example, MTS is disallowed for application to a non-dyadic block when the non-dyadic block is predicted by intra sub-partitions (ISP) intra prediction, multiple linear regression intra prediction (MIP), affine intra prediction, geometric merge mode (GEO), or combinations thereof. In another example, LFNST is disallowed for application to a non-dyadic block when the non-dyadic block is predicted by ISP, MIP, affine intra prediction, GEO, or combinations thereof. In another example, a subblock transform (SBT) is disallowed for application to a non-dyadic block when the non-dyadic block is predicted by affine intra prediction, geometric merge mode (GEO), or combinations thereof.

It should be noted that the method 2600 can be implemented in an apparatus for processing video data comprising a processor and a non-transitory memory with instructions thereon, such as video encoder 2900, video decoder 3000, and/or encoder 3100. In such a case, the instructions upon execution by the processor, cause the processor to perform the method 2600. Further, the method 2600 can be performed by a non-transitory computer readable medium comprising a computer program product for use by a video coding device. The computer program product comprises computer executable instructions stored on the non-transitory computer readable medium such that when executed by a processor cause the video coding device to perform the method 2600.

FIG. 27 is a flowchart for another example method 2700 of video processing. The method 2700 includes disallowing transform coding of residual for a block at step 2702. Specifically, the transform coding is disallowed when the block comprises a side that is non-dyadic, and is hence a non-dyadic block. At step 2706, a conversion is performed between a visual media data and a bitstream based on the block. In an example, the transform coding is disallowed by setting all residual for the block to zero and/or inferring the residual to be zero. Further, syntax that describes residual, such as coded block flags (cbf) for the block may not be included in the bitstream and inferred to be zero. In an example, a syntax element, such as a coding unit coded flag (cu_coded_flag), specifying whether the transform tree or transform unit related syntax is present for the block is not signaled for the block and inferred to be zero. As such, syntax elements specifying a presence of transform unit related syntax for the block is not signaled in the bitstream and inferred to be zero. In another example, an indication specifying application of transform matrices is not signaled in the bitstream and inferred to be zero. Such indication may generally indicate whether transform matrices are applied and/or indicate which transform (e.g., primary transform matrix, secondary transform matrix, rotation transform) is applied. In another example, disallowing transform coding of residual for the block comprises application of a transform skip, block-based delta pulse code modulation (BDPCM) mode, pallet mode, or combinations thereof to the block.

Figure 28:
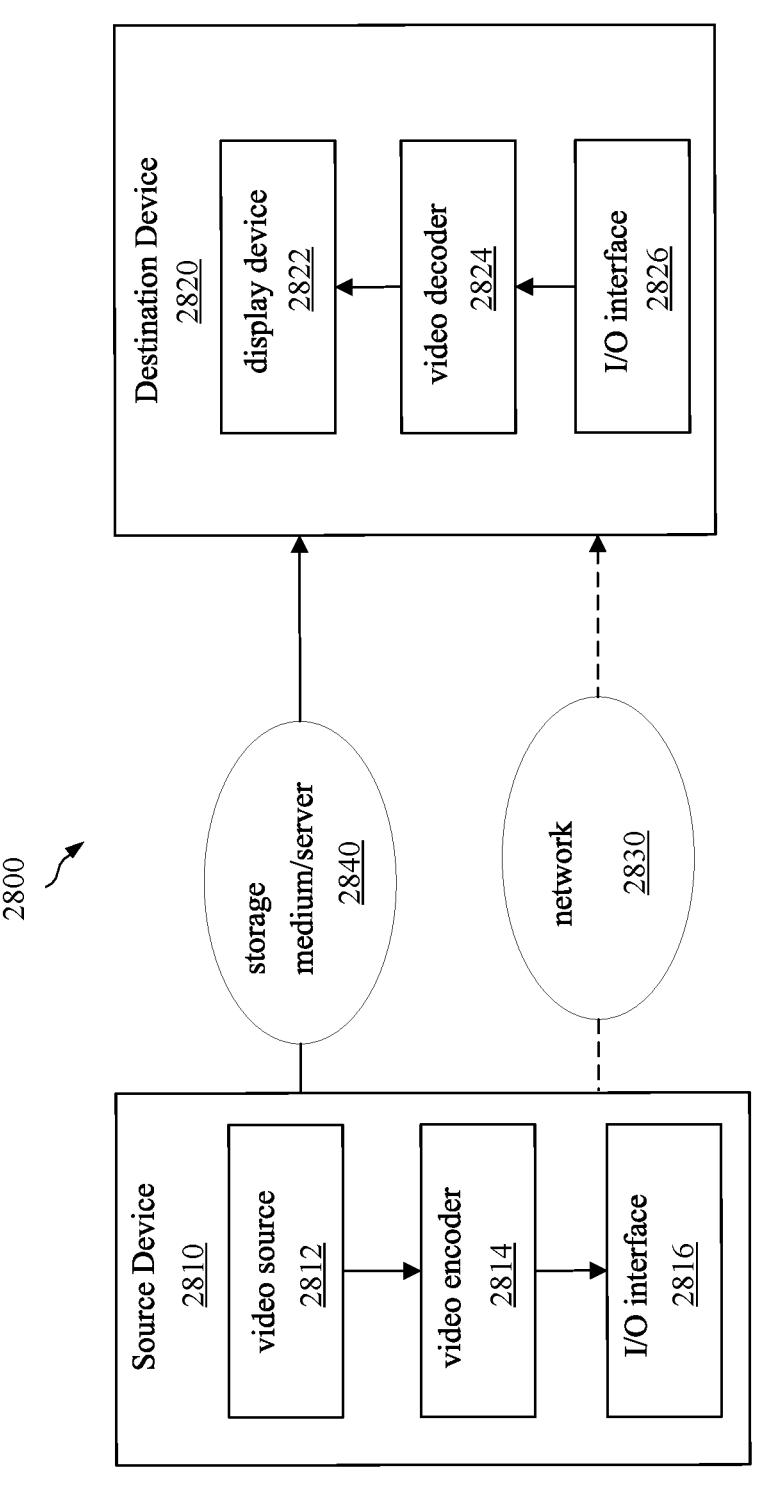
FIG. 28 is a block diagram that illustrates an example video coding system.

FIG. 28 is a block diagram that illustrates an example video coding system 2800 that may utilize the techniques of this disclosure. As shown in FIG. 28, video coding system 2800 may include a source device 2810 and a destination device 2820. Source device 2810 generates encoded video data which may be referred to as a video encoding device. Destination device 2820 may decode the encoded video data generated by source device 2810 which may be referred to as a video decoding device.

Source device 2810 may include a video source 2812, a video encoder 2814, and an input/output (I/O) interface 2816. Video source 2812 may include a source such as a video capture device, an interface to receive video data from a video content provider, and/or a computer graphics system for generating video data, or a combination of such sources. The video data may comprise one or more pictures. Video encoder 2814 encodes the video data from video source 2812 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2816 may include a modulator/demodulator (modem) and/or a transmitter. The encoded video data may be transmitted directly to destination device 2820 via I/O interface 2816 through network 2830. The encoded video data may also be stored onto a storage medium/server 2840 for access by destination device 2820.

Destination device 2820 may include an I/O interface 2826, a video decoder 2824, and a display device 2822. I/O interface 2826 may include a receiver and/or a modem. I/O interface 2826 may acquire encoded video data from the source device 2810 or the storage medium/server 2840. Video decoder 2824 may decode the encoded video data. Display device 2822 may display the decoded video data to a user. Display device 2822 may be integrated with the destination device 2820, or may be external to destination device 2820, which can be configured to interface with an external display device.

Video encoder 2814 and video decoder 2824 may operate according to a video compression standard, such as the High Efficiency Video Coding (HEVC) standard, Versatile Video Coding (VVM) standard and other current and/or further standards.

Figure 29:
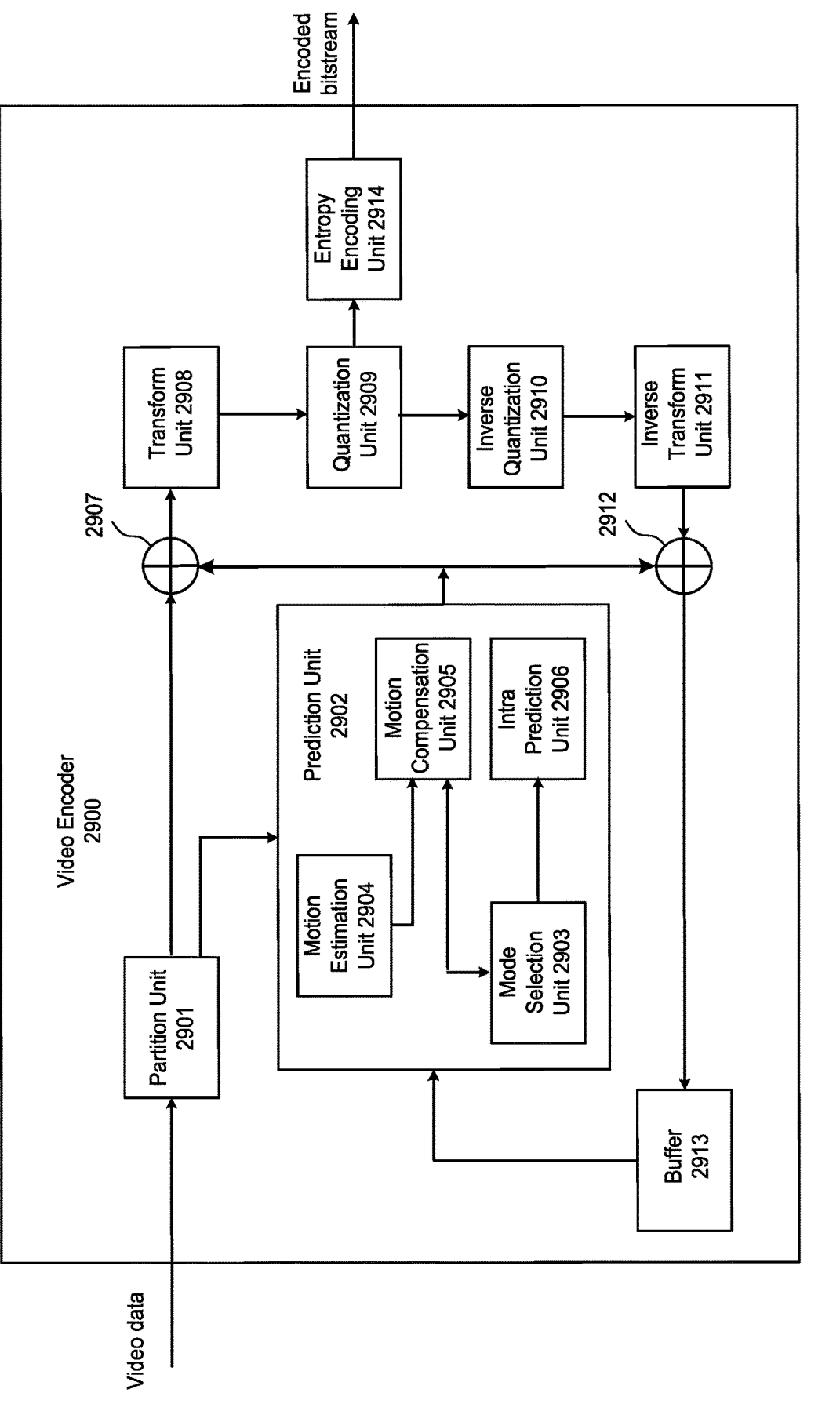
FIG. 29 is a block diagram that illustrates an example encoder.

FIG. 29 is a block diagram illustrating an example of video encoder 2900, which may be video encoder 2814 in the system 2800 illustrated in FIG. 28. Video encoder 2900 may be configured to perform any or all of the techniques of this disclosure. In the example of FIG. 29, video encoder 2900 includes a plurality of functional components. The techniques described in this disclosure may be shared among the various components of video encoder 2900. In some examples, a processor may be configured to perform any or all of the techniques described in this disclosure.

The functional components of video encoder 2900 may include a partition unit 2901, a prediction unit 2902 which may include a mode selection unit 2903, a motion estimation unit 2904, a motion compensation unit 2905, an intra prediction unit 2906, a residual generation unit 2907, a transform processing unit 2908, a quantization unit 2909, an inverse quantization unit 2910, an inverse transform unit 2911, a reconstruction unit 2912, a buffer 2913, and an entropy encoding unit 2914.

In other examples, video encoder 2900 may include more, fewer, or different functional components. In an example, prediction unit 2902 may include an intra block copy (IBC) unit. The IBC unit may perform prediction in an MC mode in which at least one reference picture is a picture where the current video block is located.

Furthermore, some components, such as motion estimation unit 2904 and motion compensation unit 2905 may be highly integrated, but are represented in the example of FIG. 29 separately for purposes of explanation.

Partition unit 2901 may partition a picture into one or more video blocks. Video encoder 2900 and video decoder 3000 may support various video block sizes.

Mode selection unit 2903 may select one of the coding modes, intra or inter, e.g., based on error results, and provide the resulting intra or inter coded block to a residual generation unit 2907 to generate residual block data and to a reconstruction unit 2912 to reconstruct the encoded block for use as a reference picture. In some examples, mode selection unit 2903 may select a combination of intra and inter prediction (CIIP) mode in which the prediction is based on an inter prediction signal and an intra prediction signal. Mode selection unit 2903 may also select a resolution for a motion vector (e.g., a sub-pixel or integer pixel precision) for the block in the case of inter prediction.

To perform inter prediction on a current video block, motion estimation unit 2904 may generate motion information for the current video block by comparing one or more reference frames from buffer 2913 to the current video block. Motion compensation unit 2905 may determine a predicted video block for the current video block based on the motion information and decoded samples of pictures from buffer 2913 other than the picture associated with the current video block.

Motion estimation unit 2904 and motion compensation unit 2905 may perform different operations for a current video block, for example, depending on whether the current video block is in an I slice, a P slice, or a B slice.

In some examples, motion estimation unit 2904 may perform uni-directional prediction for the current video block, and motion estimation unit 2904 may search reference pictures of list 0 or list 1 for a reference video block for the current video block. Motion estimation unit 2904 may then generate a reference index that indicates the reference picture in list 0 or list 1 that contains the reference video block and a motion vector that indicates a spatial displacement between the current video block and the reference video block. Motion estimation unit 2904 may output the reference index, a prediction direction indicator, and the motion vector as the motion information of the current video block. Motion compensation unit 2905 may generate the predicted video block of the current block based on the reference video block indicated by the motion information of the current video block.

In other examples, motion estimation unit 2904 may perform bi-directional prediction for the current video block, motion estimation unit 2904 may search the reference pictures in list 0 for a reference video block for the current video block and may also search the reference pictures in list 1 for another reference video block for the current video block. Motion estimation unit 2904 may then generate reference indexes that indicate the reference pictures in list 0 and list 1 containing the reference video blocks and motion vectors that indicate spatial displacements between the reference video blocks and the current video block. Motion estimation unit 2904 may output the reference indexes and the motion vectors of the current video block as the motion information of the current video block. Motion compensation unit 2905 may generate the predicted video block of the current video block based on the reference video blocks indicated by the motion information of the current video block.

In some examples, motion estimation unit 2904 may output a full set of motion information for decoding processing of a decoder. In some examples, motion estimation unit 2904 may not output a full set of motion information for the current video. Rather, motion estimation unit 2904 may signal the motion information of the current video block with reference to the motion information of another video block. For example, motion estimation unit 2904 may determine that the motion information of the current video block is sufficiently similar to the motion information of a neighboring video block.

In one example, motion estimation unit 2904 may indicate, in a syntax structure associated with the current video block, a value that indicates to the video decoder 3000 that the current video block has the same motion information as another video block.

In another example, motion estimation unit 2904 may identify, in a syntax structure associated with the current video block, another video block and a motion vector difference (MVD). The motion vector difference indicates a difference between the motion vector of the current video block and the motion vector of the indicated video block. The video decoder 3000 may use the motion vector of the indicated video block and the motion vector difference to determine the motion vector of the current video block.

As discussed above, video encoder 2900 may predictively signal the motion vector. Two examples of predictive signaling techniques that may be implemented by video encoder 2900 include advanced motion vector prediction (AMVP) and merge mode signaling.

Intra prediction unit 2906 may perform intra prediction on the current video block. When intra prediction unit 2906 performs intra prediction on the current video block, intra prediction unit 2906 may generate prediction data for the current video block based on decoded samples of other video blocks in the same picture. The prediction data for the current video block may include a predicted video block and various syntax elements.

Residual generation unit 2907 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 2907 may not perform the subtracting operation.

Transform processing unit 2908 may generate one or more transform coefficient video blocks for the current video block by applying one or more transforms to a residual video block associated with the current video block.

After transform processing unit 2908 generates a transform coefficient video block associated with the current video block, quantization unit 2909 may quantize the transform coefficient video block associated with the current video block based on one or more quantization parameter (QP) values associated with the current video block.

Inverse quantization unit 2910 and inverse transform unit 2911 may apply inverse quantization and inverse transforms to the transform coefficient video block, respectively, to reconstruct a residual video block from the transform coefficient video block. Reconstruction unit 2912 may add the reconstructed residual video block to corresponding samples from one or more predicted video blocks generated by the prediction unit 2902 to produce a reconstructed video block associated with the current block for storage in the buffer 2913.

After reconstruction unit 2912 reconstructs the video block, the loop filtering operation may be performed to reduce video blocking artifacts in the video block.

Entropy encoding unit 2914 may receive data from other functional components of the video encoder 2900. When entropy encoding unit 2914 receives the data, entropy encoding unit 2914 may perform one or more entropy encoding operations to generate entropy encoded data and output a bitstream that includes the entropy encoded data.

Figure 30:
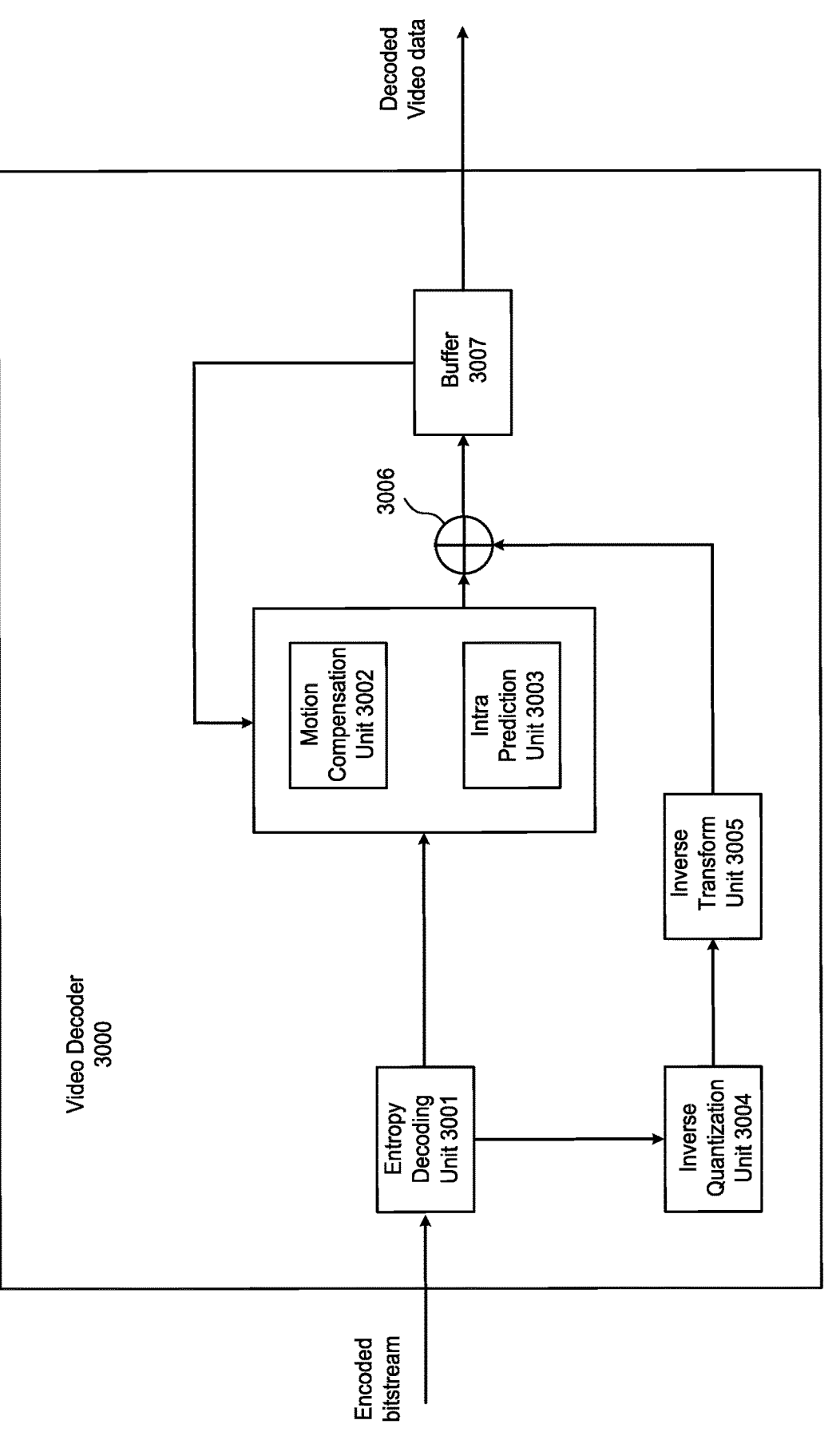
FIG. 30 is a block diagram that illustrates an example decoder.

FIG. 30 is a block diagram illustrating an example of video decoder 3000 which may be video decoder 2824 in the system 2800 illustrated in FIG. 28.

The video decoder 3000 may be configured to perform any or all of the techniques of this disclosure. In the example of FIG. 30, the video decoder 3000 includes a plurality of functional components. The techniques described in this disclosure may be shared among the various components of the video decoder 3000. In some examples, a processor may be configured to perform any or all of the techniques described in this disclosure.

In the example of FIG. 30, video decoder 3000 includes an entropy decoding unit 3001, a motion compensation unit 3002, an intra prediction unit 3003, an inverse quantization unit 3004, an inverse transformation unit 3005, and a reconstruction unit 3006 and a buffer 3007. Video decoder 3000 may, in some examples, perform a decoding pass generally reciprocal to the encoding pass described with respect to video encoder 2900 (FIG. 29).

Entropy decoding unit 3001 may retrieve an encoded bitstream. The encoded bitstream may include entropy coded video data (e.g., encoded blocks of video data). Entropy decoding unit 3001 may decode the entropy coded video data, and from the entropy decoded video data, motion compensation unit 3002 may determine motion information including motion vectors, motion vector precision, reference picture list indexes, and other motion information. Motion compensation unit 3002 may, for example, determine such information by performing the AMVP and merge mode.

Motion compensation unit 3002 may produce motion compensated blocks, possibly performing interpolation based on interpolation filters. Identifiers for interpolation filters to be used with sub-pixel precision may be included in the syntax elements.

Motion compensation unit 3002 may use interpolation filters as used by video encoder 2900 during encoding of the video block to calculate interpolated values for sub-integer pixels of a reference block. Motion compensation unit 3002 may determine the interpolation filters used by video encoder 2900 according to received syntax information and use the interpolation filters to produce predictive blocks.

Motion compensation unit 3002 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 3003 may use intra prediction modes for example received in the bitstream to form a prediction block from spatially adjacent blocks. Inverse quantization unit 3004 inverse quantizes, i.e., de-quantizes, the quantized video block coefficients provided in the bitstream and decoded by entropy decoding unit 3001. Inverse transform unit 3005 applies an inverse transform.

Reconstruction unit 3006 may sum the residual blocks with the corresponding prediction blocks generated by motion compensation unit 3002 or intra prediction unit 3003 to form decoded blocks. If desired, a deblocking filter may also be applied to filter the decoded blocks in order to remove blockiness artifacts. The decoded video blocks are then stored in buffer 3007, which provides reference blocks for subsequent motion compensation/intra prediction and also produces decoded video for presentation on a display device.

Figure 31:
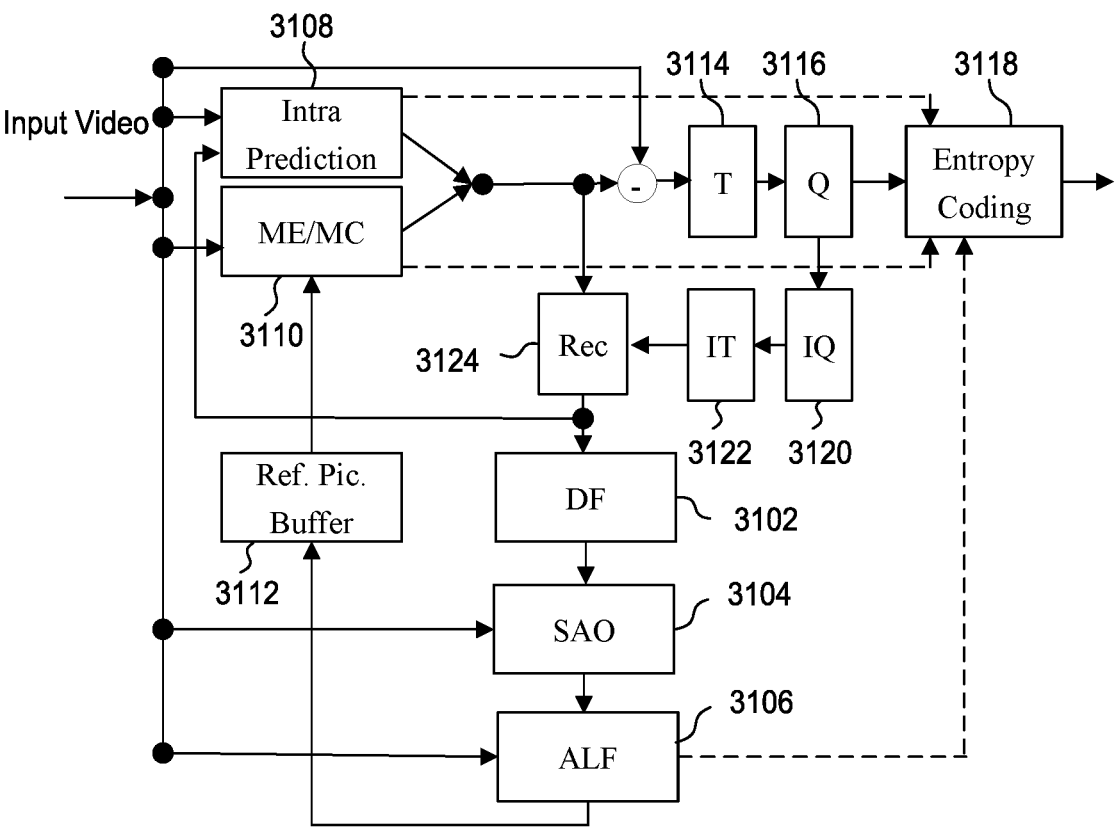
FIG. 31 is a schematic diagram of an example encoder.

FIG. 31 is a schematic diagram of an example encoder 3100. The encoder 3100 is suitable for implementing the techniques of VVC. The encoder 3100 includes three in-loop filters, namely a deblocking filter (DF) 3102, a sample adaptive offset (SAO) 3104, and an adaptive loop filter (ALF) 3106. Unlike the DF 3102, which uses predefined filters, the SAO 3104 and the ALF 3106 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 3106 is located at the last processing stage of each picture and can be regarded as a tool trying to catch and fix artifacts created by the previous stages.

The encoder 3100 further includes an intra prediction component 3108 and a motion estimation/compensation (ME/MC) component 3110 configured to receive input video. The intra prediction component 3108 is configured to perform intra prediction, while the ME/MC component 3110 is configured to utilize reference pictures obtained from a reference picture buffer 3112 to perform inter prediction. Residual blocks from inter prediction or intra prediction are fed into a transform (T) component 3114 and a quantization (Q) component 3116 to generate quantized residual transform coefficients, which are fed into an entropy coding component 3118. The entropy coding component 3118 entropy codes the prediction results and the quantized transform coefficients and transmits the same toward a video decoder (not shown). Quantization components output from the quantization component 3116 may be fed into an inverse quantization (IQ) components 3120, an inverse transform component 3122, and a reconstruction (REC) component 3124. The REC component 3124 is able to output images to the DF 3102, the SAO 3104, and the ALF 3106 for filtering prior to those images being stored in the reference picture buffer 3112.

A listing of solutions preferred by some examples is provided next.

The following solutions show examples of techniques discussed herein.

1. A method of video processing (e.g., method 2600-2700 depicted in FIGS. 26-27), comprising: determining, for a conversion between a video block of a video and a bitstream of the video, whether transform coding is enabled for the video block based on a rule; and performing the conversion based on the determining; wherein the rule specifies that whether transform coding is disabled depends on whether the video block has a dimension W×H in which at least one of W or H is a non-dyadic number.

2. The method of solution 1, wherein the rule further specifies that transform coding is disabled in case that residuals of the video block are zero.

3. The method of any of solutions 1-3, wherein the bitstream omits an indication of whether transform coding is enabled for the video block.

4. The method of solution 1, wherein the video block is coded using transform skip coding.

5. The method of solution 1, wherein the video block is coded using a bidirectional delta pulse coded modulation mode.

6. The method of solution 1, wherein the video block is coded using palette mode coding.

7. A method of video processing, comprising: performing a conversion between a video block of a video and a bitstream representation of the video according to a rule; wherein the video block has a dimension W×H, wherein the rule specifies that, due to at least one of W or H being a non-dyadic number, one or multiple transforms with dimensions different from W×H are used during the conversion.

8. The method of solution 7, wherein the rule further specifies that, due to at least one of W or H being a non-dyadic number, a zero-out transform is used during the conversion.

9. The method of solution 7, wherein the rule further specifies that, due to at least one of W or H being a non-dyadic number, a padded transform is used during the conversion.

10. The method of solution 9, wherein the bitstream includes a field indicating dimensions W1×H1 of a transform block corresponding to the video block, wherein W1>=W and H1>=H.

11. The method of solution 7, wherein the rule further specifies that, due to at least one of W or H being a non-dyadic number, the first block is split into multiple transform units that are individually coded.

12. The method of solution 7, wherein the rule further specifies that, due to at least one of W or H being a non-dyadic number, a W×H transform is applied during coding.

13. A method of video processing, comprising: performing a conversion between a video block of a video and a bitstream representation of the video according to a rule; wherein the video block has a dimension W×H, wherein the rule specifies whether or how a primary transform or a secondary transform is used during the conversion based on whether W or H is a non-dyadic number.

14. The method of solution 13, wherein the rule specifies that the primary transform is used responsive to W or H being a non-dyadic number.

15. The method of solution 13, wherein the rule specifies that the primary transform is disabled responsive to W or H being a non-dyadic number.

16. The method of any of solutions 13-15, wherein the primary transform is selected in a manner independent of whether W or H is a non-dyadic number.

17. The method of any of solutions 13-14, wherein the primary transform is selected differently based on whether W or H is a non-dyadic number.

18. The method of solution 13, wherein the rule specifies that the secondary transform is used responsive to W or H being a non-dyadic number.

19. The method of solution 13, wherein the rule specifies that the secondary transform is disabled responsive to W or H being a non-dyadic number.

20. The method of any of solutions 13-19, wherein the secondary transform is selected in a manner independent of whether W or H is a non-dyadic number.

21. The method of any of solutions 18-19, wherein the secondary transform is selected differently based on whether W or H is a non-dyadic number.

22. The method of any of solutions 1-21, wherein the video unit corresponds to a coding block.

23. The method of any of solutions 1-22, wherein the rule is selectively used responsive to a dimension of the video unit.

24. The method of any of solutions 1-23, wherein the rule is selectively used responsive to a coding information of the video unit.

25. The method of solution 24, wherein the coding information includes a color component or a coding mode or a prediction mode of the video unit.

26. The method of any of solutions 1-25, wherein the conversion includes generating the bitstream from the video.

27. The method of any of solutions 1-25, wherein the conversion includes generating the video from the bitstream.

28. A method of storing a bitstream on a computer-readable medium, comprising generating a bitstream according to a method recited in any one or more of solutions 1-26 and storing the bitstream on the computer-readable medium.

29. A computer-readable medium having a bitstream of a video stored thereon, the bitstream, when processed by a processor of a video decoder, causing the video decoder to generate the video, wherein the bitstream is generated according to a method recited in one or more of solutions 1-26.

30. A video decoding apparatus comprising a processor configured to implement a method recited in one or more of solutions 1 to 26.

31. A video encoding apparatus comprising a processor configured to implement a method recited in one or more of solutions 1 to 26.

32. A computer program product having computer code stored thereon, the code, when executed by a processor, causes the processor to implement a method recited in any of solutions 1 to 26.

33. A computer readable medium on which a bitstream complying to a bitstream format that is generated according to any of solutions 1 to 26.

34. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of processing video data, comprising:
performing a conversion between a first block of a video and a bitstream of the video, wherein the first block is a non-dyadic block with dimensions of W×H, and at least one of W and H is a non-dyadic number,
wherein whether a transform process is applied on a block of the video is based on a rule, and
wherein the rule specifies that a transform process with a dimension of W×H is applied on the first block, wherein a transform matrix with M×M elements is stored for the transform process, and the transform process is a discrete cosine transform (DCT) type two (DCT-2), a DCT type eight (DCT-8) or a DST type seven (DST-7).

2. The method of claim 1, wherein the rule specifies that a transform process with a dimension of W1×H1 is applied on a second block of the video which is a non-dyadic block with dimensions of W×H, wherein W1<W and H1<H.

3. The method of claim 2, wherein the transform process comprises applying a zero-out transform to the second block, wherein the zero-out transform comprises setting all residual coefficients outside of a top left rectangular region of W1×H1 in the second block to be zero, and wherein W1 is equal to $2^{\lfloor log_2 W \rfloor}$ and H1 is equal to $2^{\lfloor log_2 H \rfloor}$.

4. The method of claim 1, wherein the rule specifies that a padded transform is applied on a third block of the video which is a non-dyadic block with dimensions of W×H, wherein a transformed block with dimensions of W2×H2 is included in the bitstream, wherein W2>=W and H2>=H, and wherein W2 is equal to $2^{\lceil log_2 W \rceil}$ and H2 is equal to $2^{\lceil log_2 H \rceil}$.

5. The method of claim 4, wherein the rule specifies that a residual value R(i,j) before the padded transform with i from W to W2-1 and j from H to H2-1 is padded from residual values R'(m, n) with m from 0 to W−1 and n from 0 to H−1, wherein R(i,j) is padded by fixed value padding, duplicated padding or extrapolation padding.

6. The method of claim 1, wherein the rule specifies that the first block is split into a plurality of transform units (TUs), wherein at least one dimension of the plurality of the TUs is dyadic number and the TUs are transformed individually.

7. The method of claim 1, wherein the rule specifies that a multiple transform selection (MTS) transform is applied on a fourth block of the video which is a non-dyadic block with dimensions of W×H, wherein the MTS comprises at least one of a discrete cosine transform (DCT) type five (DCT-5), a DST type four (DST-4), a DST type one (DST-1) and an identity transform (IDT).

8. The method of claim 1, wherein the rule specifies that a multiple transform selection (MTS) transform is not applied on a fifth block of the video which is a non-dyadic block with dimensions of W×H, wherein the MTS is a discrete cosine transform (DCT) type two (DCT-2) or a DCT type seven (DCT-7).

9. The method of claim 1, wherein the rule specifies that transform selection for the first block employs a same selection rule as transform selection for a block with dimensions of dyadic numbers.

10. The method of claim 1, wherein the rule specifies that transform selection rules for the first block and transform selection rules for a block with dimensions of dyadic numbers are different, and wherein the transform selection rules comprise at least one of: transform candidates, a number of the transform candidates and a signaling of transform index.

11. The method of claim 1, wherein the rule specifies that a low frequency non-separable secondary transform (LFNST) is applied on a sixth block of the video which is a non-dyadic block with dimensions of W×H.

12. The method of claim 1, wherein the rule further specifies that the transform process is disallowed for application to the first block in response to W or H equal to a predetermined value.

13. The method of claim 1, wherein the rule further specifies that whether the transform process is applied on the first block is depend on a color component of the first block and/or a prediction mode of the first block, wherein a multiple transform selection (MTS) transform or a low frequency non-separable secondary transform (LFNST) is disallowed for application to the first block when the first block is predicted by an intra sub-partitions (ISP) intra prediction, a multiple linear regression intra prediction (MIP), an affine intra prediction or a geometric merge mode (GEO).

14. The method of claim 1, wherein the rule specifies that when the transform process is disabled for the first block, residuals for the first block are zero and are not signaled, and a syntax element specifying whether a transform tree or a transform unit related syntax is present for the first block is not signaled for the first block and is inferred to be zero.

15. The method of claim 14, wherein an indication specifying application of transform matrices is not signaled in the bitstream and inferred to be zero, and wherein a transform skip mode, a block-based delta pulse code modulation (BDPCM) mode, or a palette mode is applied on the first block.

16. The method of claim 1, wherein the conversion comprises encoding the first block into the bitstream.

17. The method of claim 1, wherein the conversion comprises decoding the first block from the bitstream.

18. An apparatus for processing video data comprising a processor and a non-transitory memory with instructions thereon, wherein the instructions upon execution by the processor, cause the processor to:

perform a conversion between a first block of a video and a bitstream of the video, wherein the first block is a non-dyadic block with dimensions of W×H, wherein at least one of W and H is a non-dyadic number, wherein whether a transform process is applied on the first block is based on a rule, and wherein the rule specifies that a transform process with a dimension of W×H is applied on the first block, wherein a transform matrix with M×M elements is stored for the transform process, and the transform process is a discrete cosine transform (DCT) type two (DCT-2), a DCT type eight (DCT-8) or a DST type seven (DST-7).

19. The apparatus of claim 18, wherein the rule specifies that a transform process with a dimension of W1×H1 is applied on a second block of the video which is a non-dyadic block with dimensions of W×H, wherein W1<W and H1<H, and wherein the transform process comprises applying a zero-out transform to the second block, wherein the zero-out transform comprises setting all residual coefficients outside of a top left rectangular region of W1×H1 in the second block to be zero, and wherein W1 is equal to $2^{\lfloor log_2 W \rfloor}$ and H1 is equal to $2^{\lfloor log_2 H \rfloor}$.

20. A method for storing a bitstream of a video, comprising:

generating the bitstream of the video based on a first block of the video, wherein the first block is a non-dyadic block with dimensions of W×H, wherein at least one of W and H is a non-dyadic number, and storing the bitstream in a non-transitory computer-readable recording medium, wherein whether a transform process is applied on the first block is based on a rule, and wherein the rule specifies that a transform process with a dimension of W×H is applied on the first block, wherein a transform matrix with M×M elements is stored for the transform process, and the transform process is a discrete cosine transform (DCT) type two (DCT-2), a DCT type eight (DCT-8) or a DST type seven (DST-7).

* * * * *